United States Patent
Pance et al.

(10) Patent No.: US 11,644,865 B2
(45) Date of Patent: *May 9, 2023

(54) HOUSING AS AN I/O DEVICE

(71) Applicant: Apple Inc., Cupertino, CA (US)

(72) Inventors: Aleksandar Pance, Saratoga, CA (US); Nicholas Vincent King, San Jose, CA (US); Duncan Kerr, San Francisco, CA (US); Brett Bilbrey, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/736,753

(22) Filed: May 4, 2022

(65) Prior Publication Data

US 2022/0261035 A1 Aug. 18, 2022

Related U.S. Application Data

(63) Continuation of application No. 16/923,929, filed on Jul. 8, 2020, now abandoned, which is a continuation
(Continued)

(51) Int. Cl.
*G06F 1/16* (2006.01)
*G06F 3/01* (2006.01)
(Continued)

(52) U.S. Cl.
CPC .......... *G06F 1/1616* (2013.01); *G06F 1/1656* (2013.01); *G06F 1/1671* (2013.01);
(Continued)

(58) Field of Classification Search
CPC ...... G06F 1/1616; G06F 3/016; G06F 3/0202; G06F 3/0219; G06F 3/03547
See application file for complete search history.

(56) References Cited

U.S. PATENT DOCUMENTS

| 3,333,160 A | 7/1967 | Gorski |
| 3,541,541 A | 11/1970 | Englebart |

(Continued)

FOREIGN PATENT DOCUMENTS

| CA | 1243096 | 10/1988 |
| CN | 1173672 | 2/1998 |

(Continued)

OTHER PUBLICATIONS

Anonymous. (Apr. 13, 2004). Proximity Sensor Demo Kit, User Guide, Version 0.62—Preliminary, Integration Associates, Inc., 14 pages.

(Continued)

*Primary Examiner* — Adrian S Wilson
(74) *Attorney, Agent, or Firm* — Joseph F. Guihan

(57) ABSTRACT

There are provided systems, devices and methods for operating a housing for an electronic device as an input/output (I/O) device. In one embodiment, an electronic device includes a housing configured to function as an integrated housing and I/O device and one or more sensors obscured by a panel of the housing. The one or more sensors being configured to sense via the panel of the housing. The electronic device further includes a processing unit communicatively coupled to the one or more sensors and configured to interpret electrical signals generated by the one or more sensors. One or more output devices are communicatively coupled to the processing unit and configured to provide an output in response to the one or more sensors generating an electrical signal.

20 Claims, 10 Drawing Sheets

Related U.S. Application Data of application No. 16/289,014, filed on Feb. 28, 2019, now Pat. No. 10,739,868, which is a continuation of application No. 15/423,437, filed on Feb. 2, 2017, now Pat. No. 10,248,221, which is a continuation of application No. 14/181,516, filed on Feb. 14, 2014, now Pat. No. 9,600,037, which is a continuation of application No. 12/542,471, filed on Aug. 17, 2009, now Pat. No. 8,654,524.

(51) Int. Cl.
    *G06F 3/0354*      (2013.01)
    *G06F 3/02*      (2006.01)
    *G06F 3/023*      (2006.01)
    *G06F 3/044*      (2006.01)

(52) U.S. Cl.
    CPC .......... *G06F 1/1673* (2013.01); *G06F 1/1684* (2013.01); *G06F 3/016* (2013.01); *G06F 3/0227* (2013.01); *G06F 3/0238* (2013.01); *G06F 3/03547* (2013.01); *G06F 3/044* (2013.01)

(56) References Cited

U.S. PATENT DOCUMENTS

| | | |
|---|---|---|
| 3,662,105 A | 5/1972 | Hurst et al. |
| 3,798,370 A | 3/1974 | Hurst |
| 3,883,861 A | 5/1975 | Heartz |
| 4,246,452 A | 1/1981 | Chandler |
| 4,296,410 A | 10/1981 | Higgs et al. |
| 4,369,439 A | 1/1983 | Broos |
| 4,506,354 A | 3/1985 | Hansen |
| 4,550,221 A | 10/1985 | Mabusth |
| 4,566,001 A | 1/1986 | Moore et al. |
| 4,672,364 A | 6/1987 | Lucas |
| 4,672,558 A | 6/1987 | Beckes et al. |
| 4,692,809 A | 9/1987 | Beining et al. |
| 4,695,827 A | 9/1987 | Beining et al. |
| 4,733,222 A | 3/1988 | Evans |
| 4,734,685 A | 3/1988 | Watanabe |
| 4,746,770 A | 5/1988 | McAvinney |
| 4,771,276 A | 9/1988 | Parks |
| 4,788,384 A | 11/1988 | Bruere-Dawson et al. |
| 4,806,846 A | 2/1989 | Kerber |
| 4,891,508 A | 1/1990 | Campbell |
| 4,896,370 A | 1/1990 | Kasparian et al. |
| 4,898,555 A | 2/1990 | Sampson |
| 4,933,660 A | 6/1990 | Wynne, Jr. |
| 4,968,877 A | 11/1990 | McAvinney et al. |
| 5,003,519 A | 3/1991 | Noijean |
| 5,017,030 A | 5/1991 | Crews |
| 5,059,959 A | 10/1991 | Barry |
| 5,178,477 A | 1/1993 | Gambaro |
| 5,189,403 A | 2/1993 | Franz et al. |
| 5,194,862 A | 3/1993 | Edwards |
| 5,224,151 A | 6/1993 | Bowen et al. |
| 5,224,861 A | 7/1993 | Glass et al. |
| 5,241,308 A | 8/1993 | Young |
| 5,252,951 A | 10/1993 | Tannenbaum et al. |
| 5,281,966 A | 1/1994 | Walsh |
| 5,285,037 A * | 2/1994 | Baranski ............... H01H 13/023 200/314 |
| 5,305,017 A | 4/1994 | Gerpheide |
| 5,317,105 A | 5/1994 | Weber |
| 5,342,991 A | 8/1994 | Xu et al. |
| 5,345,543 A | 9/1994 | Capps et al. |
| 5,376,948 A | 12/1994 | Roberts |
| 5,379,057 A | 1/1995 | Clough et al. |
| 5,398,310 A | 3/1995 | Tchao et al. |
| 5,408,060 A * | 4/1995 | Muurinen ............... H01H 13/83 200/312 |
| 5,442,742 A | 8/1995 | Greyson et al. |
| 5,463,388 A | 10/1995 | Boie et al. |
| 5,463,696 A | 10/1995 | Beemink et al. |
| 5,483,261 A | 1/1996 | Yasutake |
| 5,488,204 A | 1/1996 | Mead et al. |
| 5,495,077 A | 2/1996 | Miller et al. |
| 5,513,309 A | 4/1996 | Meier et al. |
| 5,521,336 A * | 5/1996 | Buchanan ............... G06F 3/045 178/18.03 |
| 5,523,775 A | 6/1996 | Capps |
| 5,530,455 A | 6/1996 | Gillick et al. |
| 5,543,590 A | 8/1996 | Gillespie et al. |
| 5,543,591 A | 8/1996 | Gillespie et al. |
| 5,544,020 A * | 8/1996 | Loeber ............... G09F 13/20 362/23.03 |
| 5,563,632 A | 10/1996 | Roberts |
| 5,563,996 A | 10/1996 | Tchao |
| 5,565,658 A | 10/1996 | Gerpheide et al. |
| 5,579,036 A | 11/1996 | Yates, IV |
| 5,581,681 A | 12/1996 | Tchao et al. |
| 5,583,946 A | 12/1996 | Gourdol |
| 5,590,219 A | 12/1996 | Gourdol |
| 5,592,566 A | 1/1997 | Pagallo et al. |
| 5,594,471 A | 1/1997 | Deeran et al. |
| 5,594,810 A | 1/1997 | Gourdol |
| 5,596,694 A | 1/1997 | Capps |
| 5,598,527 A | 1/1997 | Debrus et al. |
| 5,612,719 A | 3/1997 | Beemink et al. |
| 5,631,805 A | 5/1997 | Bonsall |
| 5,633,955 A | 5/1997 | Bozinovic et al. |
| 5,634,102 A | 5/1997 | Capps |
| 5,636,101 A | 6/1997 | Bonsall et al. |
| 5,642,108 A | 6/1997 | Gopher et al. |
| 5,644,657 A | 7/1997 | Capps et al. |
| 5,666,113 A | 9/1997 | Logan |
| 5,666,499 A | 9/1997 | Baudel et al. |
| 5,666,502 A | 9/1997 | Capps |
| 5,666,552 A | 9/1997 | Greyson et al. |
| 5,675,361 A | 10/1997 | Santilli |
| 5,675,362 A | 10/1997 | Clough et al. |
| 5,677,710 A | 10/1997 | Thompson-Rohrlich |
| 5,689,253 A | 11/1997 | Hargreaves et al. |
| 5,710,844 A | 1/1998 | Capps et al. |
| 5,729,219 A | 3/1998 | Armstrong et al. |
| 5,729,250 A | 3/1998 | Bishop et al. |
| 5,730,165 A | 3/1998 | Philipp |
| 5,736,976 A | 4/1998 | Cheung |
| 5,741,990 A | 4/1998 | Davies |
| 5,745,116 A | 4/1998 | Pisutha-Arnond |
| 5,745,716 A | 4/1998 | Tchao et al. |
| 5,748,269 A | 5/1998 | Harris et al. |
| 5,757,457 A | 5/1998 | Conway |
| 5,764,818 A | 6/1998 | Capps et al. |
| 5,766,493 A | 6/1998 | Shin |
| 5,767,457 A | 6/1998 | Gerpheide et al. |
| 5,767,842 A | 6/1998 | Korth |
| 5,770,898 A | 6/1998 | Hannigan et al. |
| 5,790,104 A | 8/1998 | Shieh |
| 5,790,107 A | 8/1998 | Kasser et al. |
| 5,802,516 A | 9/1998 | Shwarts et al. |
| 5,808,567 A | 9/1998 | McCloud |
| 5,809,267 A | 9/1998 | Moran et al. |
| 5,816,225 A | 10/1998 | Koch et al. |
| 5,821,690 A | 10/1998 | Martens et al. |
| 5,821,930 A | 10/1998 | Hansen |
| 5,823,782 A | 10/1998 | Marcus et al. |
| 5,825,308 A | 10/1998 | Rosenberg |
| 5,825,351 A | 10/1998 | Tam |
| 5,825,352 A | 10/1998 | Biss et al. |
| 5,835,079 A | 11/1998 | Shieh |
| 5,841,425 A | 11/1998 | Zenz |
| 5,854,625 A | 12/1998 | Frisch et al. |
| 5,880,411 A | 3/1999 | Gillespie et al. |
| 5,886,687 A | 3/1999 | Gibson |
| 5,898,434 A | 4/1999 | Small et al. |
| 5,900,848 A | 5/1999 | Haneda et al. |
| 5,910,776 A | 6/1999 | Black |
| 5,910,799 A | 6/1999 | Carpenter et al. |
| 5,920,309 A | 7/1999 | Bisset et al. |
| 5,923,319 A | 7/1999 | Bishop et al. |
| 5,933,134 A | 8/1999 | Shieh |

(56) References Cited

U.S. PATENT DOCUMENTS

| | | |
|---|---|---|
| 5,943,044 A | 8/1999 | Martinelli et al. |
| 5,959,612 A | 9/1999 | Breyer et al. |
| 5,975,953 A | 11/1999 | Peterson |
| 5,977,869 A | 11/1999 | Andreas |
| 5,987,793 A * | 11/1999 | Ebine .................. G09F 13/06 362/23.18 |
| 5,996,080 A | 11/1999 | Silva et al. |
| 6,002,389 A | 12/1999 | Kasser |
| 6,002,808 A | 12/1999 | Freeman |
| 6,020,881 A | 2/2000 | Naughton et al. |
| 6,031,524 A | 2/2000 | Kunert |
| 6,037,882 A | 3/2000 | Levy |
| 6,049,328 A | 4/2000 | Vanderheiden |
| 6,050,825 A | 4/2000 | Nichol et al. |
| 6,052,339 A | 4/2000 | Frenkel et al. |
| 6,067,074 A | 5/2000 | Lueders |
| 6,069,648 A | 5/2000 | Suso et al. |
| 6,072,494 A | 6/2000 | Nguyen |
| 6,084,576 A | 7/2000 | Leu et al. |
| 6,107,997 A | 8/2000 | Ure |
| 6,128,003 A | 10/2000 | Smith et al. |
| 6,130,663 A | 10/2000 | Null |
| 6,131,047 A | 10/2000 | Hayes, Jr. et al. |
| 6,131,299 A | 10/2000 | Raab et al. |
| 6,135,958 A | 10/2000 | Mikula-Curtis et al. |
| 6,144,380 A | 11/2000 | Shwarts et al. |
| 6,179,432 B1 * | 1/2001 | Zhang .................. G06F 3/0202 362/85 |
| 6,188,391 B1 | 2/2001 | Seely et al. |
| 6,198,470 B1 | 3/2001 | Agam et al. |
| 6,198,515 B1 | 3/2001 | Cole |
| 6,208,329 B1 | 3/2001 | Ballare |
| 6,222,465 B1 | 4/2001 | Kumar et al. |
| 6,232,957 B1 | 5/2001 | Hinckley |
| 6,239,790 B1 | 5/2001 | Martinelli et al. |
| 6,243,071 B1 | 6/2001 | Shwarts et al. |
| 6,246,862 B1 | 6/2001 | Grivas et al. |
| 6,249,606 B1 | 6/2001 | Kiraly et al. |
| 6,257,906 B1 | 7/2001 | Price et al. |
| 6,288,707 B1 | 9/2001 | Philipp |
| 6,289,326 B1 | 9/2001 | LaFleur |
| 6,292,178 B1 | 9/2001 | Bernstein et al. |
| 6,297,811 B1 | 10/2001 | Kent et al. |
| 6,310,610 B1 | 10/2001 | Beaton et al. |
| 6,313,825 B1 | 11/2001 | Gilbert |
| 6,323,846 B1 | 11/2001 | Westerman et al. |
| 6,327,011 B2 | 12/2001 | Kim |
| 6,337,678 B1 | 1/2002 | Fish |
| 6,347,290 B1 | 2/2002 | Bartlett |
| 6,356,287 B1 | 3/2002 | Ruberry et al. |
| 6,377,009 B1 | 4/2002 | Philipp |
| 6,380,931 B1 | 4/2002 | Gillespie et al. |
| 6,384,743 B1 | 5/2002 | Vanderheiden |
| 6,411,287 B1 | 6/2002 | Scharff et al. |
| 6,413,233 B1 | 7/2002 | Sites et al. |
| 6,414,671 B1 | 7/2002 | Gillespie et al. |
| 6,421,234 B1 | 7/2002 | Ricks et al. |
| 6,429,846 B2 | 8/2002 | Rosenberg et al. |
| 6,452,514 B1 | 9/2002 | Philipp |
| 6,457,355 B1 | 10/2002 | Philipp |
| 6,466,036 B1 | 10/2002 | Philipp |
| 6,466,203 B2 | 10/2002 | Van Ee |
| 6,515,669 B1 | 2/2003 | Mohri |
| 6,525,749 B1 | 2/2003 | Moran et al. |
| 6,535,200 B2 | 3/2003 | Philipp |
| 6,543,684 B1 | 4/2003 | White et al. |
| 6,543,947 B2 | 4/2003 | Lee |
| 6,559,831 B1 | 5/2003 | Armstrong |
| 6,570,557 B1 | 5/2003 | Westerman et al. |
| 6,587,093 B1 | 7/2003 | Shaw et al. |
| 6,593,916 B1 | 7/2003 | Aroyan |
| 6,597,347 B1 * | 7/2003 | Yasutake .............. G06F 3/0338 345/157 |
| 6,597,384 B1 | 7/2003 | Harrison |
| 6,608,271 B2 * | 8/2003 | Duarte .................. H01H 9/182 200/313 |
| 6,610,936 B2 | 8/2003 | Gillespie et al. |
| 6,624,803 B1 | 9/2003 | Vanderheiden et al. |
| 6,624,833 B1 | 9/2003 | Kumar et al. |
| 6,639,577 B2 | 10/2003 | Eberhand |
| 6,650,319 B1 | 11/2003 | Hurst et al. |
| 6,658,994 B1 | 12/2003 | McMillan |
| 6,661,410 B2 | 12/2003 | Casebolt et al. |
| 6,670,894 B2 | 12/2003 | Mehring |
| 6,677,932 B1 | 1/2004 | Westerman |
| 6,677,934 B1 | 1/2004 | Blanchard |
| 6,690,387 B2 | 2/2004 | Zimmerman et al. |
| 6,704,004 B1 * | 3/2004 | Ostergård ............. H04M 1/22 345/170 |
| 6,713,672 B1 | 3/2004 | Stickney |
| 6,724,366 B2 | 4/2004 | Crawford |
| 6,757,002 B1 | 6/2004 | Oross et al. |
| D493,157 S | 7/2004 | Yang |
| D493,158 S | 7/2004 | Yang |
| D497,606 S | 10/2004 | Yang |
| 6,800,805 B2 | 10/2004 | Deguchi |
| 6,803,906 B1 | 10/2004 | Morrison et al. |
| 6,816,149 B1 | 11/2004 | Alsleben |
| D500,298 S | 12/2004 | Yang |
| 6,834,195 B2 | 12/2004 | Brandenberg et al. |
| 6,842,672 B1 | 1/2005 | Straub et al. |
| 6,847,352 B2 | 1/2005 | Lantigua |
| 6,853,850 B2 | 2/2005 | Shim et al. |
| 6,856,259 B1 | 2/2005 | Sharp |
| 6,873,715 B2 | 3/2005 | Kuo et al. |
| 6,888,532 B2 | 5/2005 | Wong et al. |
| 6,888,536 B2 | 5/2005 | Westerman et al. |
| 6,900,795 B1 | 5/2005 | Knight, III et al. |
| 6,909,424 B2 | 6/2005 | Liebenow et al. |
| 6,924,789 B2 | 8/2005 | Bick |
| 6,927,761 B2 | 8/2005 | Badaye et al. |
| D509,819 S | 9/2005 | Yang |
| D509,833 S | 9/2005 | Yang |
| D510,081 S | 9/2005 | Yang |
| 6,942,571 B1 | 9/2005 | McAllister et al. |
| 6,943,779 B2 | 9/2005 | Satoh |
| D511,512 S | 11/2005 | Yang |
| D511,528 S | 11/2005 | Yang |
| 6,965,375 B1 | 11/2005 | Gettemy et al. |
| 6,966,032 B1 | 11/2005 | Anderson |
| D512,403 S | 12/2005 | Yang |
| D512,435 S | 12/2005 | Yang |
| 6,972,401 B2 | 12/2005 | Akitt et al. |
| 6,977,666 B1 | 12/2005 | Hedrick |
| 6,985,801 B1 | 1/2006 | Straub et al. |
| 6,987,466 B1 | 1/2006 | Welch et al. |
| 6,992,659 B2 | 1/2006 | Gettemy |
| 7,013,228 B2 | 3/2006 | Ritt |
| 7,015,894 B2 | 3/2006 | Morohoshi |
| 7,031,228 B2 | 4/2006 | Born et al. |
| 7,034,802 B1 | 4/2006 | Gettemy et al. |
| D520,516 S | 5/2006 | Yang |
| 7,046,230 B2 | 5/2006 | Zadesky |
| 7,068,256 B1 | 6/2006 | Gettemy et al. |
| 7,075,793 B2 | 7/2006 | Le et al. |
| 7,109,978 B2 | 9/2006 | Gillespie et al. |
| 7,113,196 B2 | 9/2006 | Kerr |
| 7,125,287 B1 | 10/2006 | Chou et al. |
| 7,129,416 B1 | 10/2006 | Steinfeld et al. |
| 7,129,930 B1 * | 10/2006 | Cathey .................. H01H 13/83 345/169 |
| 7,145,552 B2 | 12/2006 | Hollingsworth |
| 7,170,496 B2 | 1/2007 | Middleton |
| 7,184,064 B2 | 2/2007 | Zimmerman et al. |
| 7,193,536 B2 * | 3/2007 | Shipman ............... H01H 13/70 362/23.03 |
| 7,240,289 B2 | 7/2007 | Naughton |
| 7,244,898 B2 * | 7/2007 | Kim ..................... H01H 13/83 200/341 |
| 7,312,981 B2 | 12/2007 | Carroll |
| 7,334,362 B2 * | 2/2008 | Bladt .................... G09F 13/06 40/541 |
| RE40,153 E | 3/2008 | Westerman et al. |

(56) References Cited

U.S. PATENT DOCUMENTS

| | | | |
|---|---|---|---|
| 7,345,677 B2 | 3/2008 | Ing et al. |
| 7,366,995 B2 | 4/2008 | Montague |
| 7,388,578 B2 | 6/2008 | Tao |
| 7,411,581 B2 | 8/2008 | Hardie-Bick |
| 7,423,636 B2 | 9/2008 | Sano et al. |
| 7,452,098 B2 | 11/2008 | Kerr |
| 7,453,439 B1 | 11/2008 | Kushler et al. |
| 7,470,866 B2 | 12/2008 | Dietrich et al. |
| 7,473,139 B2 | 1/2009 | Barringer et al. |
| 7,495,659 B2 | 2/2009 | Marriot |
| 7,499,038 B2 | 3/2009 | Nishikawa et al. |
| 7,499,040 B2 | 3/2009 | Zadesky |
| 7,505,785 B2 | 3/2009 | Callaghan et al. |
| 7,511,711 B2 | 3/2009 | Ing et al. |
| 7,533,341 B2 | 5/2009 | Ko |
| 7,573,383 B2 * | 8/2009 | Yun | H03K 17/94 |
| | | | 340/687 |
| 7,575,481 B1 | 8/2009 | Liu |
| 7,592,999 B2 | 9/2009 | Rosenberg et al. |
| 7,605,707 B2 | 10/2009 | German et al. |
| 7,620,316 B2 | 11/2009 | Boillot |
| 7,656,393 B2 | 2/2010 | King et al. |
| 7,663,607 B2 | 2/2010 | Hotelling et al. |
| 7,710,397 B2 | 5/2010 | Krah et al. |
| 7,725,288 B2 | 5/2010 | Boillot |
| 7,728,799 B2 | 6/2010 | Kerr |
| 7,766,517 B2 | 8/2010 | Kerr et al. |
| 7,774,774 B1 | 8/2010 | Mulligan et al. |
| 7,800,592 B2 | 9/2010 | Kerr et al. |
| 7,834,855 B2 | 11/2010 | Hotelling et al. |
| 7,844,310 B2 | 11/2010 | Anderson |
| 7,852,369 B2 | 12/2010 | Cutler et al. |
| 7,880,131 B2 * | 2/2011 | Andre | G09F 9/30 |
| | | | 345/173 |
| 7,884,315 B2 | 2/2011 | Andre et al. |
| 7,924,175 B2 | 4/2011 | Gitzinger et al. |
| 7,982,720 B2 | 7/2011 | Rosenberg et al. |
| 3,031,181 A1 | 10/2011 | Rosenberg et al. |
| 8,029,166 B2 | 10/2011 | Kerr et al. |
| 8,033,695 B2 | 10/2011 | Kerr et al. |
| 8,059,105 B2 | 11/2011 | Rosenberg et al. |
| 8,098,233 B2 | 1/2012 | Hotelling et al. |
| 8,102,273 B2 | 1/2012 | Amano et al. |
| 8,148,913 B2 | 4/2012 | Kerr et al. |
| 8,149,226 B2 | 4/2012 | Oki |
| 8,194,049 B2 | 6/2012 | Oki |
| 8,255,868 B1 | 8/2012 | Robalewski |
| 8,264,167 B2 | 9/2012 | Kerr et al. |
| 8,390,481 B2 | 3/2013 | Pance et al. |
| 8,395,330 B2 | 3/2013 | Kerr et al. |
| 8,427,296 B2 | 4/2013 | Pance et al. |
| 8,441,790 B2 | 5/2013 | Pance et al. |
| 8,479,122 B2 | 7/2013 | Hotelling et al. |
| 8,654,524 B2 * | 2/2014 | Pance | G06F 3/03547 |
| | | | 361/679.55 |
| 8,749,523 B2 | 6/2014 | Pance et al. |
| 8,799,780 B2 | 8/2014 | Borkowski et al. |
| 8,945,972 B2 | 2/2015 | Van Krevel et al. |
| 9,384,916 B1 * | 7/2016 | Matsuoka | H01H 13/023 |
| 9,600,037 B2 * | 3/2017 | Pance | G06F 3/03547 |
| 10,248,221 B2 * | 4/2019 | Pance | G06F 3/0238 |
| 10,739,868 B2 * | 8/2020 | Pance | G06F 3/016 |
| 2001/0022719 A1 | 9/2001 | Armitage et al. |
| 2001/0035854 A1 * | 11/2001 | Rosenberg | G06F 3/0338 |
| | | | 345/156 |
| 2001/0043189 A1 | 11/2001 | Brisebois et al. |
| 2002/0008691 A1 | 1/2002 | Hanajima et al. |
| 2002/0015024 A1 | 2/2002 | Westerman et al. |
| 2002/0093492 A1 | 7/2002 | Baron |
| 2002/0118174 A1 | 8/2002 | Rodgers |
| 2002/0118848 A1 | 8/2002 | Karpenstein |
| 2002/0158838 A1 | 10/2002 | Smith et al. |
| 2003/0006974 A1 | 1/2003 | Clough et al. |
| 2003/0011574 A1 | 1/2003 | Goodman |
| 2003/0025735 A1 | 2/2003 | Polgar et al. |
| 2003/0038785 A1 * | 2/2003 | Suzuki | G06F 1/1616 |
| | | | 345/168 |
| 2003/0063072 A1 | 4/2003 | Brandenberg et al. |
| 2003/0074977 A1 | 4/2003 | Doemens et al. |
| 2003/0076301 A1 | 4/2003 | Tsuk et al. |
| 2003/0076303 A1 | 4/2003 | Huppi |
| 2003/0076306 A1 | 4/2003 | Zadesky et al. |
| 2003/0079977 A1 | 5/2003 | Wei |
| 2003/0085870 A1 | 5/2003 | Hinckley |
| 2003/0085882 A1 | 5/2003 | Lu |
| 2003/0095095 A1 | 5/2003 | Pihlaja |
| 2003/0095096 A1 | 5/2003 | Robbin et al. |
| 2003/0098858 A1 | 5/2003 | Perski et al. |
| 2003/0142855 A1 | 7/2003 | Kuo et al. |
| 2003/0179223 A1 | 9/2003 | Ying et al. |
| 2003/0206202 A1 | 11/2003 | Moriya |
| 2003/0210286 A1 | 11/2003 | Gerpheide et al. |
| 2003/0222848 A1 | 12/2003 | Solomon et al. |
| 2003/0234768 A1 | 12/2003 | Rekimoto |
| 2004/0003947 A1 | 1/2004 | Kesselman et al. |
| 2004/0008191 A1 | 1/2004 | Poupyrev et al. |
| 2004/0012572 A1 | 1/2004 | Sowden et al. |
| 2004/0021643 A1 | 2/2004 | Hoshino et al. |
| 2004/0077373 A1 * | 4/2004 | Choi | H04M 1/23 |
| | | | 455/575.1 |
| 2004/0156192 A1 | 8/2004 | Kerr |
| 2004/0212586 A1 | 10/2004 | Denny, III |
| 2004/0238195 A1 | 12/2004 | Thompson |
| 2004/0242295 A1 | 12/2004 | Ghaly |
| 2004/0246231 A1 | 12/2004 | Large |
| 2004/0247935 A1 * | 12/2004 | Bladt | G09F 13/06 |
| | | | 428/690 |
| 2004/0252109 A1 | 12/2004 | Trent, Jr. et al. |
| 2004/0263483 A1 | 12/2004 | Aufderheide |
| 2004/0263484 A1 | 12/2004 | Mantysalo et al. |
| 2005/0012723 A1 | 1/2005 | Pallakoff |
| 2005/0027744 A1 | 2/2005 | Avadhanam et al. |
| 2005/0035955 A1 | 2/2005 | Carter et al. |
| 2005/0043060 A1 | 2/2005 | Brandenberg et al. |
| 2005/0052425 A1 | 3/2005 | Zadesky et al. |
| 2005/0057916 A1 * | 3/2005 | Yu | G06F 3/0202 |
| | | | 362/84 |
| 2005/0068322 A1 | 3/2005 | Falcioni |
| 2005/0073446 A1 * | 4/2005 | Lazaridis | H01H 13/83 |
| | | | 341/22 |
| 2005/0084138 A1 | 4/2005 | Inkster et al. |
| 2005/0104867 A1 | 5/2005 | Westerman et al. |
| 2005/0110768 A1 | 5/2005 | Marriott et al. |
| 2005/0115816 A1 | 6/2005 | Gelfond et al. |
| 2005/0135053 A1 | 6/2005 | Carroll |
| 2005/0146509 A1 | 7/2005 | Geaghan et al. |
| 2005/0146513 A1 | 7/2005 | Hill et al. |
| 2005/0154798 A1 | 7/2005 | Nurmi |
| 2005/0168488 A1 | 8/2005 | Montague |
| 2005/0190158 A1 | 9/2005 | Casebolt et al. |
| 2005/0212760 A1 | 9/2005 | Marvit et al. |
| 2005/0212777 A1 * | 9/2005 | Ing | G06F 3/0433 |
| | | | 345/173 |
| 2005/0219228 A1 | 10/2005 | Alameh |
| 2005/0226455 A1 | 10/2005 | Aubauer et al. |
| 2005/0253818 A1 | 11/2005 | Nettamo |
| 2005/0275637 A1 | 12/2005 | Hinckley et al. |
| 2005/0277447 A1 * | 12/2005 | Buil | G06F 3/011 |
| | | | 455/575.1 |
| 2006/0010400 A1 | 1/2006 | Dehlin et al. |
| 2006/0022955 A1 | 2/2006 | Kennedy |
| 2006/0022956 A1 | 2/2006 | Lengeling et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0032680 A1 | 2/2006 | Elias et al. |
| 2006/0033724 A1 | 2/2006 | Chaudhri et al. |
| 2006/0034042 A1 * | 2/2006 | Hisano | G09F 9/301 |
| | | | 361/679.04 |
| 2006/0037848 A1 * | 2/2006 | Kobayashi | H04M 1/22 |
| | | | 200/310 |
| 2006/0042820 A1 | 3/2006 | Lin et al. |
| 2006/0044259 A1 | 3/2006 | Hotelling et al. |

(56) References Cited

U.S. PATENT DOCUMENTS

| | | |
|---|---|---|
| 2006/0050011 A1 | 3/2006 | Kamio |
| 2006/0053387 A1 | 3/2006 | Ording |
| 2006/0066579 A1* | 3/2006 | Bladt .................. G09F 27/00 |
| | | 345/173 |
| 2006/0066582 A1 | 3/2006 | Lyon et al. |
| 2006/0078175 A1 | 4/2006 | Brozovich |
| 2006/0079969 A1 | 4/2006 | Seguin |
| 2006/0085757 A1 | 4/2006 | Andre et al. |
| 2006/0097991 A1 | 5/2006 | Hotelling et al. |
| 2006/0109252 A1 | 5/2006 | Kolmykov-Zotov et al. |
| 2006/0161871 A1 | 7/2006 | Hotelling et al. |
| 2006/0181517 A1 | 8/2006 | Zadesky et al. |
| 2006/0183505 A1 | 8/2006 | Willrich |
| 2006/0197750 A1 | 9/2006 | Kerr et al. |
| 2006/0197753 A1 | 9/2006 | Hotelling |
| 2006/0232567 A1 | 10/2006 | Westerman et al. |
| 2006/0238517 A1 | 10/2006 | King et al. |
| 2006/0238518 A1 | 10/2006 | Westerman et al. |
| 2006/0238519 A1 | 10/2006 | Westerman et al. |
| 2006/0238520 A1 | 10/2006 | Westerman et al. |
| 2006/0238521 A1 | 10/2006 | Westerman et al. |
| 2006/0238522 A1 | 10/2006 | Westerman et al. |
| 2006/0244733 A1 | 11/2006 | Geaghan |
| 2006/0245808 A1* | 11/2006 | Salman .................. G06F 3/0238 |
| | | 400/490 |
| 2006/0267953 A1 | 11/2006 | Peterson et al. |
| 2006/0284855 A1 | 12/2006 | Shintome |
| 2007/0046646 A1 | 3/2007 | Kwon et al. |
| 2007/0063923 A1 | 3/2007 | Koenig |
| 2007/0075968 A1 | 4/2007 | Hall et al. |
| 2007/0080818 A1* | 4/2007 | Yun ...................... H01R 13/641 |
| | | 340/584 |
| 2007/0085845 A1 | 4/2007 | Kikuchi et al. |
| 2007/0136064 A1 | 6/2007 | Carroll |
| 2007/0182722 A1 | 8/2007 | Hotelling et al. |
| 2007/0229464 A1 | 10/2007 | Hotelling et al. |
| 2007/0236466 A1 | 10/2007 | Hotelling |
| 2007/0242033 A1 | 10/2007 | Cradick et al. |
| 2007/0247429 A1 | 10/2007 | Westerman |
| 2007/0257890 A1 | 11/2007 | Hotelling et al. |
| 2007/0273561 A1 | 11/2007 | Philipp |
| 2008/0012835 A1 | 1/2008 | Rimon et al. |
| 2008/0012838 A1 | 1/2008 | Rimon |
| 2008/0048971 A1 | 2/2008 | Beckhusen et al. |
| 2008/0084404 A1 | 4/2008 | Andre et al. |
| 2008/0088602 A1 | 4/2008 | Hotelling |
| 2008/0103637 A1 | 5/2008 | Bliven et al. |
| 2008/0111788 A1 | 5/2008 | Rosenberg et al. |
| 2008/0158172 A1 | 7/2008 | Hotelling et al. |
| 2008/0174321 A1 | 7/2008 | Kang et al. |
| 2008/0179172 A1* | 7/2008 | Sellers .................. H01H 13/83 |
| | | 200/314 |
| 2008/0211772 A1 | 9/2008 | Loucks |
| 2008/0238725 A1 | 10/2008 | Gitzinger et al. |
| 2008/0238879 A1 | 10/2008 | Jaeger et al. |
| 2008/0266257 A1 | 10/2008 | Chiang |
| 2008/0278450 A1 | 11/2008 | Lashina |
| 2008/0297476 A1 | 12/2008 | Hotelling et al. |
| 2008/0309511 A1* | 12/2008 | Kerr .................... G06F 1/1684 |
| | | 340/815.53 |
| 2009/0002328 A1 | 1/2009 | Ullrich et al. |
| 2009/0008234 A1 | 1/2009 | Tolbert et al. |
| 2009/0052715 A1 | 2/2009 | Zhang et al. |
| 2009/0066670 A1 | 3/2009 | Hotelling et al. |
| 2009/0085894 A1 | 4/2009 | Gandhi et al. |
| 2009/0096757 A1 | 4/2009 | Hotelling et al. |
| 2009/0096758 A1 | 4/2009 | Hotelling et al. |
| 2009/0151475 A1* | 6/2009 | Masaki ................ G01L 1/146 |
| | | 73/862.68 |
| 2009/0173533 A1 | 7/2009 | Brock et al. |
| 2009/0173534 A1 | 7/2009 | Keiper et al. |
| 2009/0176391 A1 | 7/2009 | Brock et al. |
| 2009/0189878 A1 | 7/2009 | Goertz et al. |
| 2009/0244836 A1 | 10/2009 | Leng et al. |
| 2009/0266170 A1 | 10/2009 | Murashige et al. |
| 2009/0284465 A1 | 11/2009 | Oki et al. |
| 2009/0295738 A1 | 12/2009 | Chiang |
| 2009/0295753 A1 | 12/2009 | King et al. |
| 2009/0303231 A1 | 12/2009 | Robinet et al. |
| 2010/0011291 A1 | 1/2010 | Nurmi |
| 2010/0026656 A1 | 2/2010 | Hotelling et al. |
| 2010/0044067 A1 | 2/2010 | Wong et al. |
| 2010/0122439 A1 | 5/2010 | Britton et al. |
| 2010/0141605 A1 | 6/2010 | Kang et al. |
| 2010/0164888 A1 | 7/2010 | Okumura et al. |
| 2010/0238139 A1 | 9/2010 | Goertz et al. |
| 2010/0301755 A1 | 12/2010 | Pance et al. |
| 2010/0306683 A1 | 12/2010 | Pance et al. |
| 2011/0037624 A1 | 2/2011 | Pance et al. |
| 2011/0037734 A1 | 2/2011 | Pance et al. |
| 2011/0038114 A1* | 2/2011 | Pance .................. G06F 1/1656 |
| | | 361/679.01 |
| 2011/0043227 A1 | 2/2011 | Pance et al. |
| 2011/0057873 A1 | 3/2011 | Geissler et al. |
| 2011/0119973 A1 | 5/2011 | Andre et al. |
| 2011/0175813 A1 | 7/2011 | Sarwar et al. |
| 2016/0014390 A1 | 1/2016 | Ligtenberg et al. |
| 2019/0196605 A1 | 6/2019 | Pance et al. |

FOREIGN PATENT DOCUMENTS

| | | |
|---|---|---|
| CN | 1397870 | 2/2003 |
| CN | 1720499 | 1/2006 |
| CN | 1737827 | 2/2006 |
| CN | 1942853 | 4/2007 |
| CN | 201898231 | 7/2011 |
| DE | 10251296 | 5/2004 |
| EP | 0288692 | 2/1988 |
| EP | 0464908 | 1/1992 |
| EP | 0664504 | 7/1995 |
| EP | 1014295 | 6/2000 |
| EP | 1241557 | 9/2002 |
| EP | 1241558 | 9/2002 |
| EP | 1505484 | 2/2005 |
| GB | 2380583 | 9/2003 |
| GB | 2393688 | 7/2004 |
| JP | 58112263 | 7/1983 |
| JP | 63257824 | 10/1988 |
| JP | 63-292774 | 11/1988 |
| JP | 0764725 | 3/1995 |
| JP | 7182101 | 7/1995 |
| JP | 09244810 | 9/1997 |
| JP | 9305262 | 11/1997 |
| JP | 10228350 | 8/1998 |
| JP | 11-215217 | 8/1999 |
| JP | 2000-163031 | 6/2000 |
| JP | 2001356878 | 12/2001 |
| JP | 2002501271 | 1/2002 |
| JP | 2002062972 | 2/2002 |
| JP | 2002185630 | 6/2002 |
| JP | 2002229719 | 8/2002 |
| JP | 2002-342033 | 11/2002 |
| JP | 2002342034 | 11/2002 |
| JP | 2003-058316 | 2/2003 |
| JP | 2003241872 | 8/2003 |
| JP | 2003330611 | 11/2003 |
| JP | 2004070920 | 3/2004 |
| JP | 2004226715 | 8/2004 |
| JP | 2004340991 | 12/2004 |
| JP | 2005-006259 | 1/2005 |
| KR | 20010047975 | 6/2001 |
| WO | 9718547 | 5/1997 |
| WO | 9723738 | 7/1997 |
| WO | 9814863 | 4/1998 |
| WO | 9938149 | 7/1999 |
| WO | 03001576 | 1/2003 |
| WO | 03065192 | 8/2003 |
| WO | 03088176 | 10/2003 |
| WO | 2004111816 | 12/2004 |
| WO | 2005083547 | 9/2005 |
| WO | 2006023569 | 3/2006 |
| WO | 2006094308 | 9/2006 |
| WO | 2006096501 | 9/2006 |

(56) References Cited

FOREIGN PATENT DOCUMENTS

| | | |
|---|---|---|
| WO | 2007083894 | 7/2007 |
| WO | 2007103631 | 9/2007 |
| WO | 2010014560 | 2/2010 |

OTHER PUBLICATIONS

Anonymous. "Touch Technologies Overview" 2001, 3M Touch Systems, Massachusetts.

Anonymous. "4-Wire Resistive Touchscreens" obtained from http://www.touchscreens.com/intro-touchtypes-4resistive.html generated Aug. 5, 2005.

Anonymous. "5-Wire Resistive Touchscreens" obtained from http://www.touchscreens.com/intro-touchtypes-resistive.html generated Aug. 5, 2005.

Anonymous. "A Brief Overview of Gesture Recognition" obtained from http://www. Dai. Ed. Ac.uk/Cvonline/LOCA_COPIES/COHEN/gesture_ overview. Html, generated Apr. 20, 2004.

Anonymous. "Capacitive Position Sensing" obtained from http://www.synaptics.com/technology/cps.cfin generated Aug. 5, 2005.

Anonymous "Capacitive Touchscreens obtained from http://www.touchscreens.com/intro touchtypes-capacitive.html generated Aug. 5, 2005."

Anonymous. "Comparing Touch Technologies" obtained from http://www.touchscreens.com/intro-touchtypes.html generated Oct. 10, 2004.

Anonymous. "FingerWorks—Gesture Guide—Application Switching," obtained from http://www.fingerworks.com/gesture_guide_apps.html, generated on Aug. 27, 2004, 1-pg.

Anonymous. "FingerWorks—Gesture Guide—Editing," obtained from http://www.fingerworks.com/gesure_guide_editing.html, generated on Aug. 27, 2004, 1-pg.

Anonymous. "FingerWorks—Gesture Guide—File Operations," obtained from http://www.fingerworks.com/gesture_guide_files.html, generated on Aug. 27, 2004, 1-pg.

Anonymous. "FingerWorks—Gesture Guide—Text Manipulation," obtained from http://www.fingerworks.com/gesture_guide_text_manip.html, generated on Aug. 27, 2004, 2-pg.

Anonymous. "FingerWorks—Gesture Guide—Tips and Tricks," obtained from http://www.fingerworks.com/gesture_guide_tips.html, generated Aug. 27, 2004, 2 pgs.

Anonymous. "FingerWorks—Gesture Guide—Web," obtained from http://www.fingerworks.com/gesture_guide_web.html, generated on Aug. 27, 2004, 1-pg.

Anonymous. "FingerWorks—Guide to Hand Gestures for USB Touchpads," obtained from http://www.fingerworks.com/gesture_userguide.html, generated Aug. 27, 2004, 1 pg.

Anonymous. "FingerWorks—iGesture—Technical Details," obtained from http://www.fingerworks.com/igesture_tech.html, generated Aug. 27, 2004, 1-pg.

Anonymous. "FingerWorks—The Only Touchpads with Ergonomic Full-Hand Resting and Relaxation!" obtained from http://www.fingerworks.com/resting.html, Copyright 2001, 1-pg.

Anonymous. "FingerWorks—Tips for Typing on the Mini," obtained from http://www.fingerworks.com/mini_typing.html, generated on Aug. 27, 2004, 2-pgs.

Anonymous. "GlidePoint®" obtained from http://www.cirque.com/technology/technology_gp.html generated Aug. 5, 2005.

Anonymous. "Gesture Recognition" http://www.fingerworks.com/gesture_recognition.html>, Jul. 2, 2006.

Anonymous. "How do touchscreen monitors know where you're touching?" obtained from http://www.electronics.howstuffworks.com/question716.html generated Aug. 5, 2005.

Anonymous. "How does a touchscreen work?" obtained from http://www.touchscreens.com/intro-anatomy.html generated Aug. 5, 2005.

Anonymous. "iGesture Pad—the MultiFinger USB TouchPad with Whole-Hand Gestures,"obtained from http://www.fingerworks.com/igesture.html, generated Aug. 27, 2004, 2-pgs.

Anonymous. "iGesture Products for Everyone (learn in minutes) Product Overview" FingerWorks.com downloaded Aug. 30, 2005.

Anonymous. "Infrared Touchscreens" obtained from http://www.touchscreens.com/intro touchtypes-infrared.html generated Aug. 5, 2005.

Anonymous. "Mouse Emulation" FingerWorks obtained from http://www.fingerworks.com/gesture_guide_mouse.html generated Aug. 30, 2005.

Anonymous. "Mouse Gestures in Opera" obtained from http://www.opera.com/products/desktop/mouse/index.dml generated Aug. 30, 2005.

Anonymous. "Mouse Gestures," Optim oz, May 21, 2004.

Anonymous. "MultiTouch Overview" FingerWorks obtained from http://www.fingerworks.com/multoverview.html generated Aug. 30, 2005.

Anonymous. "Near Field Imaging Touchscreens" obtained from http://www.touchscreens.com/intro-touchtypes-nfi.html generated Aug. 5, 2005.

Anonymous. "PenTouch Capacitive Touchscreens" obtained from http://www.touchscreens.com/intro-touchtypes-pentouch.html generated Aug. 5, 2005.

Anonymous. "Surface Acoustic Wave Touchscreens" obtained from http://www.touchscreens.com/intro-touchtypes-saw.html generated Aug. 5, 2005.

Anonymous. "Symbol Commander" obtained from http://www.sensiva.com/symbolcommander/, generated Aug. 30, 2005.

Anonymous. "Wacom Components—Technology" obtained from http://www.wacom-components.com/english/tech.asp generated on Oct. 10, 2004.

Anonymous. "Watershed Algorithm" http://rsb.info.nih.gov/ij/plugins/watershed.html generated Aug. 5, 2005.

Bier et al., "Toolglass and Magic Lenses: The see-through interface" in James Kijiya, editor, Computer Graphics (SIGGRAPH '93 Proceedings), vol. 27, pp. 73-80, Aug. 1993.

Douglas et al., The Ergonomics of Computer Pointing Devices (1997).

European Examination Report dated Apr. 21, 2008, for EP Application No. 06737515.4, filed Mar. 3, 2006, five pages. (93.47).

European Search Report received in EP 1 621 989 (@ Beyer Weaver & Thomas, LLP) dated Mar. 27, 2006.

European Search Report dated Nov. 9, 2010, for EP Application No. 10010075.9, filed Mar. 3, 2006, six pages. (93.47).

EVB Elektronik "TSOP6238 IR Receiver Modules for Infrared Remote Control Systems" dated Jan. 2004 1-pg.

Final Office Action dated Nov. 8, 2012, for U.S. Appl. No. 12/184,190, filed Jul. 31, 2008, 20 pages. (235.00).

Final Office Action dated Nov. 21, 2008, for U.S. Appl. No. 11/115,539, filed Apr. 26, 2005, 23 pages. (210.00).

Final Office Action dated Aug. 25, 2009, for U.S. Appl. No. 11/367,749, filed Mar. 3, 2006, 12 pages. (93.00).

Final Office Action dated Oct. 14, 2009, for U.S. Appl. No. 11/115,539, filed Apr. 26, 2005, 10 pages. (210.00).

Final Office Action dated Jun. 30, 2010, for U.S. Appl. No. 11/367,749, filed Mar. 3, 2006, 12 pages. (93.00).

Final Office Action dated Jul. 1, 2011, for U.S. Appl. No. 12/486,710, filed Jun. 17, 2009, 19 pages. (93.02).

Final Office Action dated Jul. 13, 2011, for U.S. Appl. No. 11/966,948, filed Dec. 28, 2007, 10 pages. (93.01).

Final Office Action dated Sep. 4, 2012, for U.S. Appl. No. 12/486,710, filed Jun. 17, 2009, 25 pages. (93.02).

Fisher et al., "Repetitive Motion Disorders: The Design of Optimal Rate-Rest Profiles," Human Factors, 35 (2):283-304 (Jun. 1993).

Fukumoto and Yoshinobu Tonomura, "Body Coupled Fingering: Wireless Wearable Keyboard," CHI97, pp. 147-154 (Mar. 1997).

Fukumoto et al., "ActiveClick: Tactile Feedback for Touch Panels," in CHI 2001 Summary, pp. 121-122, 2001.

Gear Live Review: iRiver clix Review, obrained from http://www.gearlive.com/index.php/news/article/gear-live-review-iriver-clix-review-713400/, dated Jul. 13, 2006, 8 pages.

Hardy, "Fingerworks" Mar. 7, 2002; BBC World On Line.

Hillier and Gerald J. Lieberman, Introduction to Operations Research (1986).

(56) References Cited

OTHER PUBLICATIONS

Hinckley et al., "Touch-Sensing Input Devices," in CHI '99 Proceedings, pp. 223-230, 1999.
International Search Report dated Mar. 3, 2006 (PCT/US 05/03325; 119 0052WO).
International Search Report dated Jul. 25, 2006, from corresponding International Application No. PCT/US2006/007585 with Written Opinion, nine pages. (210.40).
International Search Report dated Oct. 6, 2006, for PCT Application No. PCT/US2006/08349, filed Mar. 3, 2006, three pages. (93.40).
International Search Report dated Jan. 3, 2008, for PCT Application No. PCT/US2007/062474, filed Feb. 21, 2007, three pages. (93.41).
International Search Report dated Nov. 27, 2009, for PCT Application No. PCT/US2009/051874, Filed Jul. 27, 2009, three pages.
Iriver clix Product Guide, copyright 1999-2006, 38 pages.
Iriver clix Quick Start Guide, undated, 2 pages.
Jacob et al., "Integrality and Separability of Input Devices," ACM Transactions on Computer-Human Interaction, 1:3-26 (Mar. 1994).
Xionx "KXP84 Series Summary Data Sheet" copyright 2005, dated Oct. 21, 2005, 4-pgs.
Lee, "A Fast Multiple-Touch-Sensitive Input Device," Master's Thesis, University of Toronto (1984).
Lee, S.K. et al., "A Multi-Touch Three Dimensional Touch-Sensitive Tablet," in CHI '85 Proceedings, pp. 121-128, 2000 [(Apr. 1985). Conference Proceedings: Human Factors in Computing Systems, pp. 21-25.].
Matsushita et al., "HoloWall: Designing a Finger, Hand, Body and Object Sensitive Wall," in Proceedings of UIST '97, Oct. 1997.
Non-Final Office Action dated Jul. 2, 2008, for U.S. Appl. No. 11/115,539, filed Apr. 26, 2005, 18 pages. (210.00).
Non-Final Office Action dated Feb. 26, 2009, for U.S. Appl. No. 11/367,749, filed Mar. 3, 2006, 10 pages. (93.00).
Non-Final Office Action dated Apr. 2, 2009, for U.S. Appl. No. 11/426,078, filed Jun. 23, 2006, 21 pages. (93.20).
Non-Final Office Action dated Apr. 6, 2009, for U.S. Appl. No. 11/115,539, filed Apr. 26, 2005, 31 pages. (210.00).
Non-Final Office Action dated Jan. 12, 2010, for U.S. Appl. No. 11/367,749, filed Mar. 3, 2006, eight pages. (93.00).
Non-Final Office Action dated Jan. 15, 2010, for U.S. Appl. No. 11/115,539, filed Apr. 26, 2005, 10 pages. (210.00).
Non-Final Office Action dated Jan. 28, 2011, for U.S. Appl. No. 11/966,948, filed Dec. 28, 2007, 11 pages. (93.01).
Non-Final Office Action dated Mar. 9, 2011, for U.S. Appl. No. 12/486,710, filed Jun. 17, 2009, 13 pages. (93.02).
Non-Final Office Action dated Dec. 2, 2011, for U.S. Appl. No. 12/184,190, filed Jul. 31, 2008, 21 pages. (235.00).
Non-Final Office Action dated Mar. 28, 2012, for U.S. Appl. No. 12/486,710, filed Jun. 17, 2009, 25 pages. (93.02).
Non-Final Office Action dated Jul. 5, 2012, for U.S. Appl. No. 12/184,190, filed Jul. 31, 2008, 19 pages. (235.00).
Non-Final Office Action dated Jun. 6, 2013, for U.S. Appl. No. 12/486,710, filed Jun. 17, 2009, 28 pages. (93.02).
Non-Final Office Action dated Jul. 5, 2013, for U.S. Appl. No. 11/367,749, filed Mar. 3, 2006, eight pages. (93.00).
Notice of Allowance dated Sep. 25, 2009, for U.S. Appl. No. 11/426,078, filed Jun. 23, 2006, 14 pages. (93.20).
Notice of Allowance dated Jun. 2, 2010, for U.S. Appl. No. 11/115,539, filed Apr. 26, 2005, eight pages. (210.00).
Press Release, "iriver clix Delivers Complete Package for Portable Entertainment Fans," obtained from www.iriveramerican.com/images.pdf/iriv_clix.pdf, dated May 17, 2006, 3 pages.
Quantum Research Group "QT510 / Qwheel™ Touch Slider IC" copyright 2004-2005, 14-pgs.
Quek, "Unencumbered Gestural Interaction," IEEE Multimedia, 3:36-47 (Winter 1996).
Radwin, "Activation Force and Travel Effects on Overexertion in Repetitive Key Tapping," Human Factors, 39(1):130-140 (Mar. 1997).
Rekimoto et al., "ToolStone: Effective Use of the Physical Manipulation Vocabularies of Input Devices," in Proc. of UIST 2000, 2000.
Rekimoto, J. (2002). "SmartSkin: An Infrastructure for Freehand Manipulation on Interactive Surfaces," CHI 2002, Apr. 20-25, 2002. [(Apr. 25, 2002). 4(1):113-120.].
Rubine et al., "Programmable Finger-Tracking Instrument Controllers," Computer Music Journal, vol. 14, No. 1 (Spring 1990).
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Rutledge et al., "Force-to-Motion Functions for Pointing," Human-Computer Interaction—Interact (1990).
Subatai Ahmad, "A Usable Real-Time 3D Hand Tracker," Proceedings of the 28th Asilomar Conference on Signals, Systems and Computers—Part 2 (of 2), vol. 2 (Oct. 1994).
Texas Instruments, "TSC2003/12C Touch Screen Controller," Data Sheet SBAS 162, dated Oct. 2001, 20 pages.
U.S. Appl. No. 10/789,676, filed Feb. 27, 2004 entitled "Shape Detecting Input Device".
Wellner, "The Digital Desk Calculators: Tangible Manipulation on a Desk Top Display" in ACM UIST '91 Proceedings, pp. 27-34, Nov. 1991.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Williams, "Applications for a Switched-Capacitor Instrumentation Building Block" Linear Technology Application Note 3, Jul. 1985, pp. 1-16.
Yamada et al., "A Switched-Capacitor Interface for Capacitive Pressure Sensors" IEEE Transactions on Instrumentation and Measurement, vol. 41, No. 1, Feb. 1992, pp. 81-86.
Haruyama, U.S. Appl. No. 13/577,757, filed Feb. 1, 2013.
Yeh et al., "Switched Capacitor Interface Circuit for Capacitive Transducers" 1985 IEEE.
Zhai et al., "Dual Stream Input for Pointing and Scrolling," Proceedings of CHI' 97 Extended Abstracts (1997).
Zimmerman et al., "Applying Electric Field Sensing to Human-Computer Interfaces," in CHI '85 Proceedings, pp. 280-287, 1995.

* cited by examiner

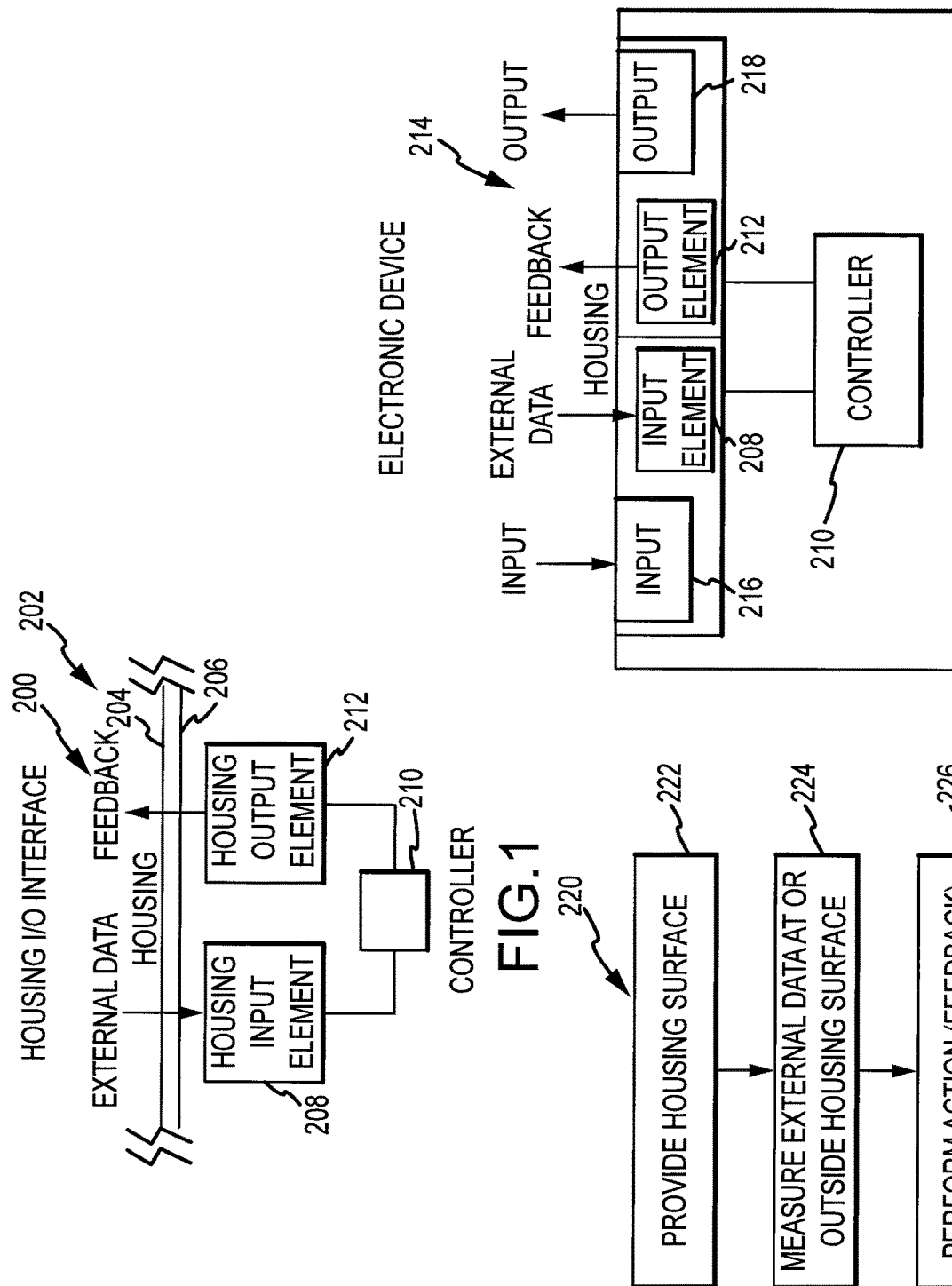

HOUSING AS AN I/O DEVICE

This application is a continuation of U.S. patent application Ser. No. 16/923,929, filed on Jul. 8, 2020, which is a continuation of U.S. patent application Ser. No. 16/289,014, filed on Feb. 28, 2019, now U.S. Pat. No. 10,739,868, which is a continuation of U.S. patent application Ser. No. 15/423,437, filed on Feb. 2, 2017, now U.S. Pat. No. 10,248,221, which is a continuation of U.S. patent application Ser. No. 14/181,516, filed on Feb. 14, 2014, now U.S. Pat. No. 9,600,037, which is a continuation application of U.S. patent application Ser. No. 12/542,471, filed on Aug. 17, 2009, now U.S. Pat. No. 8,654,524, each of which are hereby incorporated by reference herein in their entireties. This application claims the benefit of and claims priority to U.S. patent application Ser. No. 16/923,929, filed on Jul. 8, 2020, U.S. patent application Ser. No. 16/289,014, filed on Feb. 28, 2019, now U.S. Pat. No. 10,739,868, U.S. patent application Ser. No. 15/423,437, filed on Feb. 2, 2017, now U.S. Pat. No. 10,248,221, U.S. patent application Ser. No. 14/181,516, filed on Feb. 14, 2014, now U.S. Pat. No. 9,600,037, and U.S. patent application Ser. No. 12/542,471, filed on Aug. 17, 2009, now U.S. Pat. No. 8,654,524. The following related applications are hereby incorporated by reference in their entirety: United States patent publication number 2013/0135213 and United States patent publication number 2011/0037734.

BACKGROUND

I. Technical Field

The present invention relates generally to electronic devices and, more particularly, to housings of electronic devices providing input/output (I/O) functionality.

II. Background Discussion

Electronic devices such as desktop computers, notebook computers, personal digital assistants, cell phones and mobile media devices have become ubiquitous in today's society. They serve as work tools, communication devices and provide entertainment, among other things. Generally, the "brains" and operative parts of electronic devices are enclosed in housings made of plastic, metal and/or glass that may provide an aesthetically pleasing appearance. Typically, however, the housings simply provide structural integrity to the devices and protect potentially sensitive component parts of the electronic devices from external influences.

Users generally interact with electronic devices through discrete input/output (I/O) devices such as a keyboard, mouse, camera, monitor, printer, and so forth. In some instances, I/O devices are located at least partially within the housing and accessible through openings in the housing. For example, portable computing devices such as notebook computers typically provide a keyboard and trackpad secured to the housing and accessible to a user through cutouts in the housing. In other instances, I/O devices may be external to the housing and communicatively coupled to the electronic device either wirelessly or by wired means.

SUMMARY

Certain embodiments may take the form of housings for electronic devices with integrated I/O and related methods. For example, in one embodiment, an electronic device includes a housing configured to function as an integrated housing and I/O device and one or more sensors obscured by a wall of the housing. The one or more sensors may be configured to sense inputs, such as through a touch or via the wall of the housing. The electronic device further includes a processing unit communicatively coupled to the one or more sensors and configured to interpret electrical signals generated by the one or more sensors. One or more output devices may be communicatively coupled to the processing unit and configured to provide an output in response to the one or more sensors generating an electrical signal.

Another embodiment takes the form of an electronic device housing having a wall with at least one exposed surface and an interior surface. One or more sensors are positioned within the housing and proximate to the wall's interior surface in order to sense user interactions with the exposed surface and generate electrical signals based on the interactions. A controller is communicatively coupled to the one or more sensors and may interpret the electrical signals as and electronic device input. The controller may also generate an output signal. Additionally, at least one output device is positioned within the housing and communicatively coupled to the controller to receive the output signal. In response to receiving the output signal, the at least one output device provides output via the housing.

Yet another embodiment may take the form of or include an electronic device housing having one or more walls configured to house an electronic device wherein the one or more walls are configured to operate as an input/output (I/O) device. The one or more walls are externally exposed. The one or more walls may be made of microperforated material. In other embodiments, the one or more walls may be made of plastic, glass or other material that is not microperforated. A proximity sensor is positioned within an interior of the housing and proximate to the one or more walls. The proximity sensor is configured to sense user input via the one or more walls. A processor is coupled to the proximity sensor and configured to process electrical signals generated by the proximity sensor. Additionally, at least one light emitting diode may be positioned within the interior of the housing and proximate to the one or more walls. The at least one light emitting diode is actuated by the processor in response to the electrical signals generated by the proximity sensor.

Yet another embodiment may take the form of a method of operating an electronic device. The electronic device may have one or more surfaces configured to provide housing I/O functionality and the method includes operating a proximity sensor to determine when objects are proximately located to one or more housing I/O surfaces the device. The proximity sensor is obscured at least in part by the housing of the electronic device and senses through the housing of the electronic device. One or more output devices may be actuated in response to the proximity sensor generating a signal indicating and object being proximately located to the one or more housing I/O surfaces. The one or more output devices are obscured by the housing of the electronic device and provide output via the housing of the electronic device.

BRIEF DESCRIPTION OF THE DRAWINGS

FIG. 1 is a simplified block diagram of a housing I/O interface.

FIG. 2 is a simplified block diagram of an electronic device implementing the housing I/O interface of FIG. 1 and convention input and output devices.

FIG. 3 is a flowchart illustrating a method for operating the electronic device of FIG. 2.

DETAILED DESCRIPTION

Figure 4:
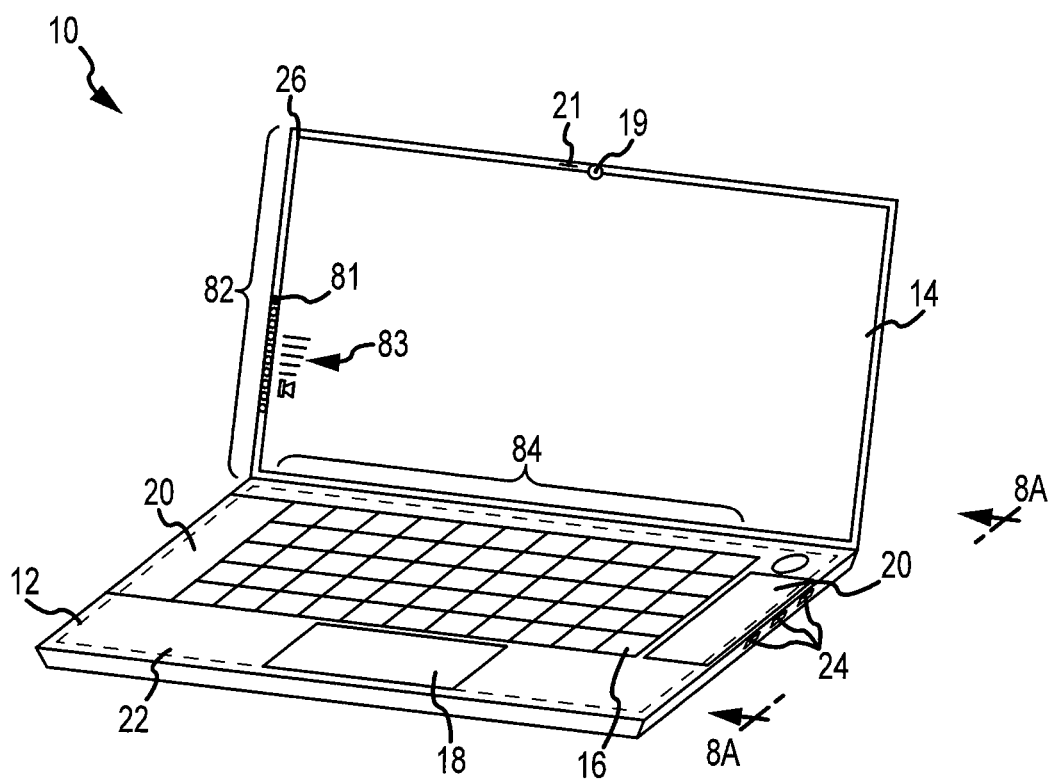
FIG. 4 illustrates a portable computing device with a housing that provides I/O functionality.

Generally, one embodiment takes the form of an electronic device housing providing I/O functionality. That is, the user interface forms part of the housing and the housing receives input and/or provides output for the device. Hence, the housing is part of the I/O system and certain inputs and/or outputs are not separate mechanisms from the housing. In particular, one or more surfaces of a housing are configured to accept user input and/or provide output when the device and/or the surface(s) is actuated. When not actuated, however, the surface(s) appears and functions like other surfaces of the housing that are not configured to provide I/O functionality. Specifically, the housing is configured to enclose and protect internal components as well as form the ornamental appearance of the device. It should be clear that the housing is the I/O and not a mechanism built through an opening in the housing. Hence, the sensors are obscured by the housing and visually imperceptible on outer surfaces of the housing. The surfaces of the housing receive and provide I/O. The I/O are no longer separate mechanisms situated in the housing.

In one embodiment, with regards to input, the housing is configured with one or more sensors. The sensors may be coupled directly to the housing, within the housing, or adjacent to a surface of the housing. The sensors are provided internal the outer periphery of the housing thus not impacting the surfaces of the housing. Specifically, the sensors are within the walls of the housing, adjacent an inner surface of the housing or contained within the volume of the housing like other internal components. User actions such as approaching, touching, tapping, holding, and/or squeezing may be detected and interpreted by the device as input. Using the sensors, the housing may be capable of proximity sensing, touch sensing, pressure sensing, and the like. Thus, the housing may be referred to and act as an input device. Various sensing technologies can be combined to provide enhanced inputs. For example, accelerometers may be used in combination with other sensing technology previously mentioned.

With regards to output, in one embodiment, the housing may be configured with display elements, such as light emitters, and/or haptic actuators, which can be associated with the sensors mentioned above. The light emitters may provide light to surfaces of the housing. In some embodiments, the surface of the housing may be made of microperforated material which may serve as the housing and which can cover an extended surface, i.e., an entire back surface of a housing, the entire enclosure surface, or specific locations about the surface of the housing. The haptic actuators may be located within the housing and provide vibration, pulse feedback, or other haptic feedback.

One or more specific embodiments are described in greater detail below with reference to the drawings and in the context of a computer system. However, the disclosed embodiments should not be interpreted or otherwise used as limiting the scope of the disclosure, including the claims. In addition, one skilled in the art will understand that the following description has broad application and the discussion of any particular embodiment is meant only to be exemplary and is not intended to suggest that the scope of the disclosure, including the claims, is limited to these embodiments.

FIG. 1 is a simplified block diagram of a housing I/O interface 200 having a housing wall 202. As shown, the housing wall 202 defines an outer surface 204, which may help form an exterior portion of an electronic device, and an inner surface 206, which may help form an interior portion of the electronic device. One or more housing input elements 208 are disposed within the outer periphery or exterior portion of the electronic device. By way of example, the one or more housing elements 208 may be disposed within the space defined by multiple walls (not shown), adjacent the walls, and/or embedded within an inner portion of the walls. The housing input element configuration may not affect the exterior portion of the housing wall 202 thereby keeping the sensors substantially hidden. The housing input element 208 may be situated at a portion of a wall, an entire wall, or multiple walls. Thus, the housing input element 208 may define an active area that may be over an extended surface of the wall 202, i.e., the entire back surface, the entire enclosure surface and/or select areas, i.e., specific locations about the surface of the housing. Furthermore, the active area may be localized or short range (touch or near touch) or extended or long range (substantially away from the surface). Specifically, the housing input element 208 is configured to receive external data via the wall 202. As such, input directed at an active area of the wall 202 is registered by the housing input element 208.

The housing input element 208 may be widely varied. For example, the housing input element 208 may correspond to touch sensors, pressure sensors, proximity sensors, etc. As such, the housing input element 208 may be interchangeably referred to as sensor or sensors. The housing input element 208 may operate alone or in conjunction with other sensors and/or input devices to extract the desired information from the surroundings of the electronic device. The sensors are configured to interact at the exterior portion or outside the outer periphery of the electronic device and generate electrical signals correlative with the interactions. The electrical signals generated by the housing input element 208 are provided to a controller 210 that is configured to interpret the electrical signals as input to the electronic device. The controller 210 may generate an output signal in response to the input. The output signal may be provided to an housing output element 212. The housing output element 212 may be disposed within the outer periphery or exterior portion of the electronic device and configured to provide output via the wall 202. The housing output element 212 may include display elements, such as light emitters, haptic actuators, speakers etc.

The housing I/O interface 200 may be implemented in a variety of electronic devices including, but not limited to, portable computing devices, cell phones, televisions, personal computers, smart phones, personal digital assistants, media players, appliances such as refrigerators, microwave ovens, etc. and any other suitable electronic device. As such, although the description included herein may include some specific embodiments and may be related to particular functions, it should be understood that the housing I/O interface may be implemented in a wade variety of device and may perform a variety of functions beyond the embodiments specifically described herein.

FIG. 2 illustrates a simplified block diagram of an electronic device 214 implementing the housing I/O interface of FIG. 1. As shown, the electronic device 214 may include traditional input devices 216 and output devices 218 that may operate concurrently with the housing input element 208 and housing output element 212. The controller 210 may be configured to receive the inputs from the input devices 216 and the input elements 208, and may provide control signals to the output element 212 and the output devices 218. The traditional input devices 216 may include, for example, a keyboard, a mouse, a trackpad, etc. and the traditional output devices 218 may include, for example, a monitor, a speaker, etc. It should be understood that while appropriate accommodations (i.e. apertures, etc.) may located within the housing of the electronic device 214 for the conventional input and output devices 216 and 218, the surface of the device housing over the input element 208 and output element 212 is solid with no breaks. As such, the input element 208 and output element 212 are obscured by the surface and the surface appears to be a non-functional wall of the housing of the electronic device.

The information obtained from the one or more sensors of the input element 208 may be used to perform actions in the electronic device 214. Thus, the sensor and housing may be referred to as a housing user interface or housing input device. As should be appreciated, user actions such as approaching (proximity), touching, tapping, holding, squeezing relative to the housing may be used by the electronic device 214 to perform actions. Additionally, when combined together, these user actions can provide different levels of user input. For example, proximity may initiate a first user input, touching may initiate a second user input, and squeezing may initiate a third user input. Of course, sensor inputs may be combined to form a single input (e.g., proximity+touch=first signal, touch+squeeze=second signal, holding+orientation=third signal, etc.). Furthermore, the user actions that are interpreted as input by the housing I/O interface may be combined or otherwise used in conjunction with the input device 216 and/or output device 218 to provide an appropriate feedback or response to the user input.

The location of the sensors may be placed at strategic locations. For example, in one embodiment, sensors associated with adjusting sound may be placed proximate speakers, or sensors associated with light output of a display may be placed proximate the display or sensors associated with connectors may be placed proximate the connectors. In one embodiment, a tap on the housing surface near the speaker area of the electronic device may change the balance or volume of the speaker(s). In one embodiment, by touching a housing surface in the vicinity of a camera, a user may be able to turn on/off the camera as for example for a video conference (e.g., iChat). Basically, location based controls that are hidden from view can be created.

In one embodiment, a proximity sensor or touch sensor may be placed near a feedback indicator such as a sleep indicator. When a user approaches and/or touches, the sleep indicator or area around the sleep indicator, the electronic device may initiate a sleep or wake function. For example, if the electronic device is already in sleep, the user action may cause the computer to wake (or vice versa).

In one embodiment, a proximity or touch sensor may be used to detect areas around a group of connectors so that the connectors can be identified via a feedback mechanism (e.g., port identification). The feedback mechanism may be implemented via a display that identifies the nearby connector and possibly instructs the user to which cable/connector should be used, i.e., if the user places their finger near a USB connector, the display may present a window that indicates "USB". Alternatively or additionally, the housing may include indicators that present this information (see below). Alternatively or additionally, the feedback may be provided through speakers via a voice that says "USB".

In one embodiment, if large parts of the housing surface are touch enabled. A location context based user interface may be established. For example, if a user touches a surface an action may be applied to the closest enabled control. For example, touching near a power button may be interpreted as power button control, so a single touch may put the device to sleep while a double touch may turn it off.

In one embodiment, squeezing the device may be used as a control. For example, squeezing the device may be used to adjust the volume up and down. The actual control function may be associated with an application currently running on the device. For example, if the user is listening to music, then a squeeze may be used to adjust volume while if the user is reading something a squeeze may be used to zoom in and out. In one embodiment, squeezing left side of housing means one thing, while squeezing left means another thing. For example, squeezing the left hand side may decrease volume and squeezing the right hand side may increase volume.

In one embodiment, sensing where the user is holding a device and determining the orientation via an accelerometer or the like, the user interface may be rotated so that it is properly orientated for the user.

The electronic device 214 may be configured to provide output and/or feedback to a user. For example, in some cases this may be through conventional output devices 218 such as displays, speakers, etc. In other cases, this may be provided via the housing of the electronic device using through the output elements 212. By way of example, the output elements 212 may be disposed within the space defined by the walls of the electronic device 214, adjacent the walls, and/or embedded within an inner portion of the walls. The elements 212 configuration may not affect the exterior portion of the housing of the electronic device 214, thereby keeping the elements 212 substantially hidden. The elements 212 may be situated at a portion of a wall, an entire wall, or multiple walls of the electronic device 14.

The output elements 212 may work alone or in conjunction with other output elements (such as the conventional output device 218) to provide the desired information to the surroundings of the electronic device. In cases where the housing is used to output information, the output element and housing may be referred to as a housing user interface or housing output device. When integrated with housing, the output elements active area may be over an extended surface of the wall portion, i.e., the entire back surface, the entire enclosure surface and/or select areas, i.e., specific locations about the surface of the housing.

Like the sensors 208, the location of the output elements 212 may be placed at strategic locations. For example, output elements 212 associated with inputs may be placed proximate the input area. In one embodiment, a display element, such as a light emitter, may be located near a control actuators for devices, such as speakers for example. The light emitter may actuate when the speakers are operating to indicate that the speakers are operating. Additionally, the light emitters may indicate a volume of the speakers based on the intensity of the light emitted or, alternatively, by illuminating a larger area of the surface under which the light emitters are obscured.

In one embodiment, the housing surface may provide a keyboard and/or a trackpad and/or other controls that are activated for use depending on the user's needs. This embodiment may be referred to as a "virtual keyboard." The controls are invisible when not in use and become visible when in use. In this example, the sensors 208 may be used to detect taps or touches on the housing surface while an output element 212 such as a display or illumination element may be used to provide a control graphic on the housing surface. In one example, the top surface of the base of a laptop computer may be a single continuous housing surface with no or limited breaks (e.g., openings). It does not include a separate keyboard and/or touch pad situated therein. The top surface is free of one or both of these devices. In one example, the housing surface is made touch sensitive and is combined with illumination to indicate the keys and/or touch pad area.

In one embodiment, the keyboard is made visible by detecting the proximity of an object such as a hand or finger near the surface and not visible when the hand or finger is moved out of the active area of the proximity sensor.

In one embodiment, when device is in sleep mode, graphics within housing may be used to give limited information without waking the device up. For example, the housing may provide an indication of remaining battery life. Additionally or alternatively, the housing may provide an indication of a wireless communication signal strength. These indications may be visual, audible and/or haptic.

FIG. 3 is a flowchart illustrating a basic method of operation 220 for a device implementing the housing I/O interface. The method 220 includes providing a housing surface with which a user may interact, as indicated at block 222. The housing surface may be an external surface of a housing wall that appears as a non-operative surface. That is the surface appears just as other surfaces of the housing that do not provide input and/or output functionality to the device. The surface is continuous for portions of the housing that provide input/output functionality. External data at or outside the housing surface is measured via the surface, as indicated at block 224. The data is interpreted as input to the device and the device performs an action in response to the input, as indicated at block 226. In one embodiment, the action may include providing feedback to the user via the surface. Specifically, audible, haptic, or visual feedback may be provided to the user via the surface FIG. 4 illustrates an example portable computing device 10 having a housing 12 with integrated I/O. The portable computing device 10 may represent an example embodiment of the device 214 of FIG. 2, for example. The portable computing device 10 may include a display 14, a keyboard 16, a trackpad 18 and speakers 20. In some embodiments the device 10 may also include a camera 19 and/or a microphone 21. The display 14 and speakers 20 provide output to users and the keyboard 16, trackpad 18, camera 19, and microphone 21 allow users to provide input to the device 10. While generally providing structure to the device 10, the housing 12 may also provide I/O functionality.

The housing 12 may be plastic, metal, glass, or any other suitable material and/or any combination of materials. In some embodiments, the housing 12 may have small perforations (e.g., micro perforations) to allow light to pass through the housing 12. The small perforations may range in size from tens of microns to one millimeter, or any other appropriate size. The housing 12 includes a lower portion 22 that houses the keyboard 16, trackpad 18 and speakers 20. In one embodiment, the keyboard 16, trackpad 18 and speakers 20 may be positioned within the lower housing 22 and accessed via openings in the housing, as illustrated. The lower portion 22 may also include ports 24 for connecting the device 10 with other devices (not shown). An upper portion 26 of the housing 12 includes the display 14, camera 19 and microphone 21. The upper portion 26 may be mechanically coupled to the lower portion with a hinge (not shown). [0047] In addition to the I/O devices that are externally visible to a user, the housing 12 may have one or more sensors and/or actuators that are located within the housing (and hidden from view) that provide I/O functionality to the housing 12. Housing I/O is thus achieved. That is the housing 12 of the device is capable of functioning as an input and/or output device independent of conventional input/output devices. In housing I/O, the housing 12 does not appear to be an input/output device but, rather, simply appears to be a housing. There are no breaks in the housing 12 to provide for I/O and the surface of the housing used for I/O in housing I/O is continuous and of the same material as other portions of housing 12 that may not provide any I/O functionality. In one embodiment, there may be sensors and actuators lining the perimeter of the lower and upper portions 22 and 26 of the housing 12, as illustrated by the dashed lines. The sensors and actuators may be located near and/or coupled to the interior surface of the housing, thus facilitating a user's access to the housing I/O functionality. For example, the sensors and actuators may be located under the surface of the housing 12 partially containing the keyboard 16 and trackpad 18.

Figure 5:
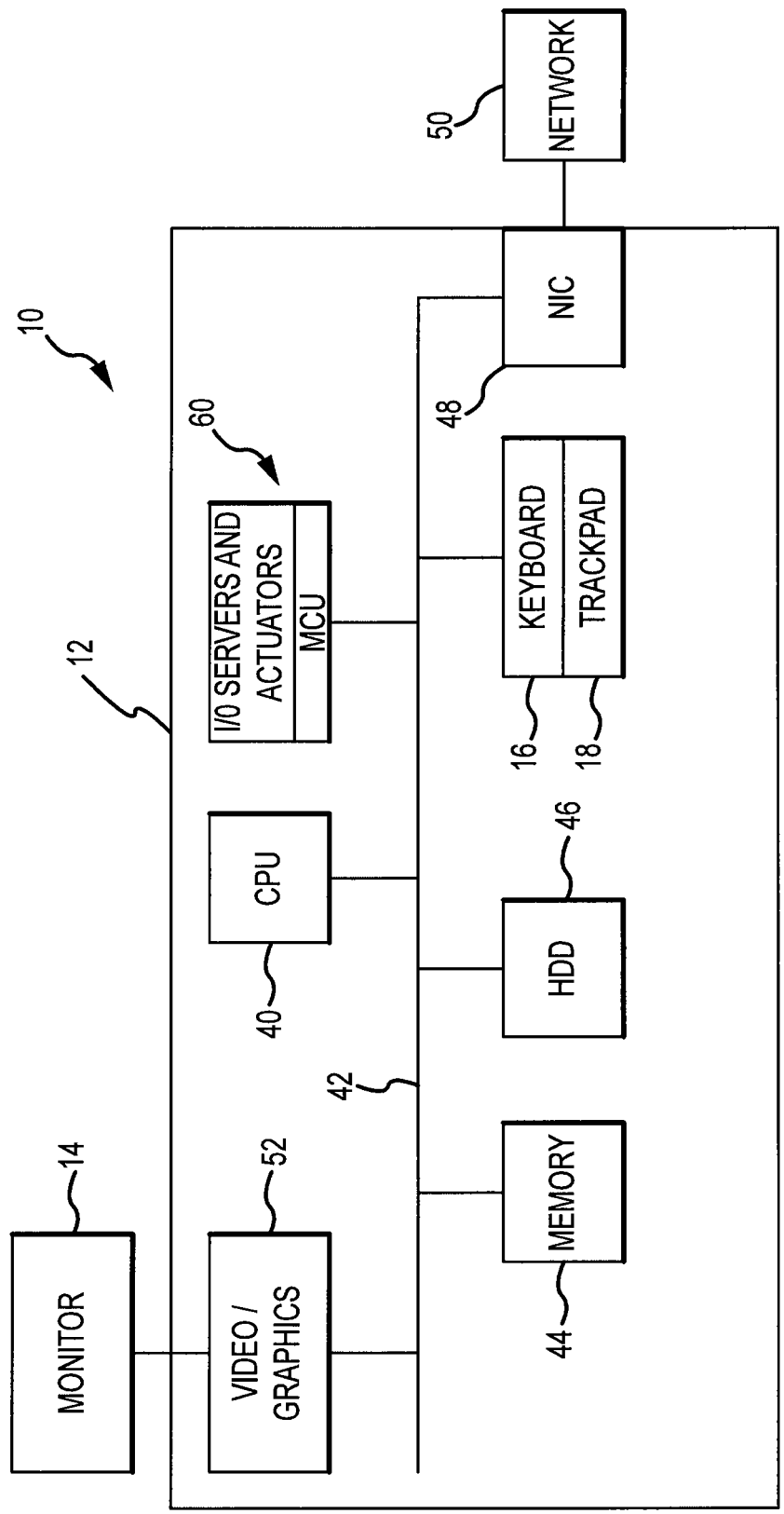
FIG. 5 is a simplified block diagram of the portable computing device illustrated in FIG. 1.

A simplified block diagram of the portable computing device 10 is illustrated in FIG. 5. As can be seen, the portable computing device 10 includes a central processing unit (CPU) 40. The CPU 40 may be any suitable microprocessor and may include one or more processing cores. As one example, in some embodiments, the CPU 40 may be a microprocessor manufactured by Intel, such as the 80X86, or Core 2 Duo® processor, and may be configured to process data and execute applications and programs. Specifically, the CPU 40 may be configured to operate one or more operating systems, such as Mac OS X from Apple or Microsoft Windows, for example, and applications compatible with the operating systems.

The CPU 40 may be communicatively coupled to other component parts of the portable computing device 10. Specifically, in some embodiments, the CPU 40 may be coupled to other component parts of the portable computing system 10 via one or more busses. In some embodiments, the portable computing device 10 may have multiple busses coupled between the CPU 40 and dedicated chip sets, memory or device expansion slots, for example, such as a Northbridge chip, random access memory (RAM) and/or a PCI graphics board. Busses may also transmit data between chip sets, such as from the Northbridge chip to the Southbridge chip and vice versa. For the sake of simplicity, however, only a single bus 42 is illustrated.

The example bus structure 42 couples a memory 44, a storage memory 46, the display 14, the keyboard 16, the trackpad 18, and a network interface device 48 to the CPU 40. The memory 44 may be dynamic RAM, static RAM, or any other suitable type of memory including flash memory and read-only memory, for example. The storage memory 46 may be any suitable storage memory, such as a hard disk drive, semiconductor disk drive, tape drive, flash drive, etc. The storage memory 46 may store data, applications, programs, and/or an operating system. The network interface device 48 may be coupled to one of the aforementioned ports 24 and may allow for the portable computing device 10 to communicate with other devices over a network 50. The display 14 may be coupled to the bus 42 via a video/graphics device 52 that may include dedicated memory and processor for processing graphics for the display 14. It should be understood that some embodiments may include more or fewer components and may be configured in a variety of different ways.

The bus 42 may also couple I/O sensors and actuators 60 to the CPU 40. The I/O sensors and actuators 60 may be positioned throughout the housing 12 to receive input and provide output for the device 10. In particular, the sensors and actuators 60 may be located within the housing 12 in particular regions of the housing 12 or under particular regions or areas of the housing 12 to provide a specific or general housing I/O functionality. The sensors and actuators 60 may be coupled to one or more walls of the housing 12, integrated into the housing 12, or within an interior defined by the housing 12.

Figure 6:
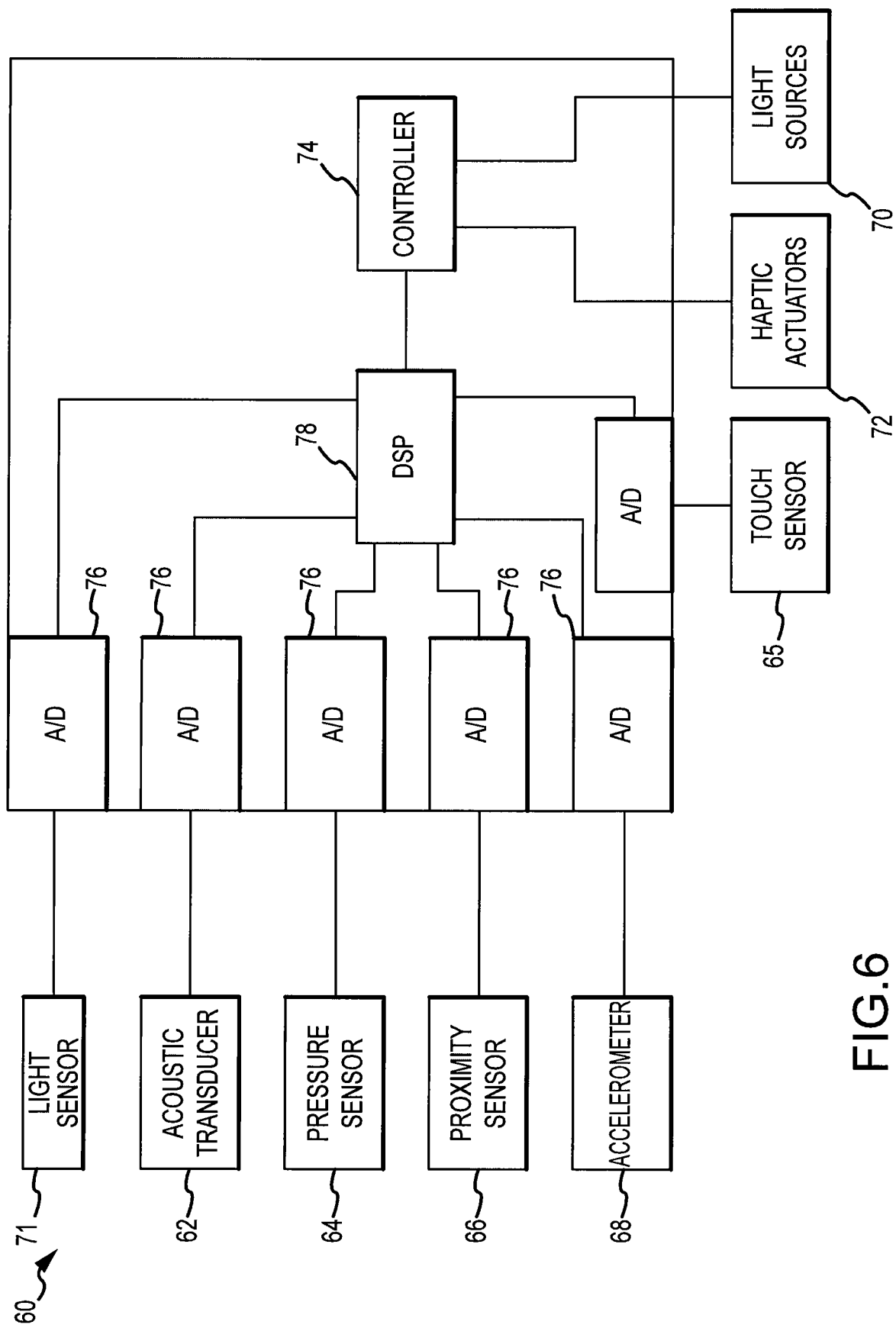
FIG. 6 is a block diagram of sensors and actuators that may be implemented in the portable computing device of FIG. 1.

FIG. 6 illustrates a block diagram including one or more I/O sensors and/or actuators 60 that may be implemented for the housing 12 to provide I/O functionality. As shown in FIG. 6, the I/O sensors and actuators 60 may include acoustic transducers 62, pressure sensors 64, touch sensors 65, proximity sensors 66, accelerometers 68, light sources 70, Light sensors 71 and haptic actuators 72, for example. The acoustic transducers 62 may be, for example, microphones and/or speakers. Microphones may be used to sense when a user taps, scratches, or otherwise touches surfaces of the device 10 housing 12 and speakers may be used to provide audible feedback to a user. The pressure sensors 64 may include capacitive sensors, strain gauge sensors, piezoelectric sensors, resistive sensors, etc. and may be used to determine when a user presses or applies pressure to the housing 12 of the device 1.0. The proximity sensors 66 may include ultrasonic sensors, IR sensors, photosensitive sensors, capacitive sensors, inductive sensors, etc. and are operated to determine when objects, such as users fingers and/or connectors are near the device 10 or a surface of the device 10. The light sources 70 may include light emitting diodes (LEDs), organic LEDs, incandescent light sources, etc. that are actuated to output light that is generally visible to users. The light sensors 71 may include photosensitive diodes, photosensitive transistors, etc. The haptic actuators 72 may include vibration actuators, pulsing actuators, etc. that are actuated to provide touch feedback to users. The accelerometers 68 may include accelerometers and other devices to determine direction such as magnetometers or compass chips, for example. Data provided from the accelerometers 68 may be used in combination with input received from other sensors to determine conditions of use, such as if the user is holding the device, for example, and may be used to provide feedback to a user and/or auto configure the operation of the device 10, as discussed in greater detail below.

The I/O sensors and actuators 60 may be controlled by a microcontroller unit ("controller") 74. The controller 74 may be any suitable controller such as a model 8742 manufactured by Intel Corporation, or a PIC16F84 manufactured by Microchip, Inc. Additionally, in some embodiments, the controller 74 may be part of a larger integrated circuit having one or more microprocessors operating as master controllers and one or more microprocessors operating as slave controllers to the master controllers. Accordingly, the controller 74 may be configured to operate in either master or slave modes depending on the particular application and configuration. The microcontroller 74 may include hardware and/or software to control actuation and operation of multiple I/O sensors and actuators described in greater detail below. Additionally, the controller 74 may be communicatively coupled to the CPU 40 or other component parts of the portable computing device 10.

Electrical signals generated by sensors may be converted to digital signals by analog-to-digital converter 76. The digitized signals may further be processed by a digital signal processor (DSP) 78 before being passed to the controller 74. Any general of special purpose (specialized for processing a particular sensor type output) DSP chip can be used. In an alternative embodiment, DSP algorithms may be executed by the CPU 40 itself. In other embodiments, no DSP 78 is used. Rather, the digitized signals may go directly to the controller 74, or to the processor 40, which may further process the signals.

The I/O sensors and actuators 60 may be positioned throughout the housing 12 and configured to enhance a user's experience with the device 10. In particular, the I/O sensors and actuators 60 may be configured to receive input from a user's interaction with the housing 12 and/or provide output to a user. For example, pressure sensors 64 and/or touch sensors 65 may be located underneath a bezel portion of the upper housing to sense user interactions with the bezel. Additionally or alternatively, pressure sensors 64, touch sensors 65, proximity sensors 66 and/or acoustic transducers 62, etc., may be located underneath a surface of the lower housing 22 to sense user interactions with the lower housing 22. In some embodiments, the sensors may generate signals (input) that may be used to control applications operating on the device.

In other embodiments, the signals may be used to control the operation of output devices, as will be discussed below. In particular, the signals received from housing sensors in housing I/O may actuate output devices and/or adjust output parameters of output device. Further, specific types of housing I/O input may be used to control particular functions of the put devices.

In one embodiment, for example, pressure sensors 64 or touch sensors 65 may be positioned near the speakers 20 to determine when a user touches or applies pressure to the housing 12 near or over the speakers 20. The sensed touch or pressure may be converted into an electrical signal and used in a number of ways to provide a desired effect. In one embodiment, the sensing of touch or pressure being applied to the housing 12 near the speaker 20 may turn on and/or turn off the speaker 20. Specifically, the pressure sensor 64 may generate an electrical signal correlative to the amount of pressure being applied over a period of time. In the case of turning on and off the speaker 20, the generated signal may be an impulse signal that lasts only a fraction of a second resulting from the user simply tapping a surface near the speaker 20. In another embodiment, a more prolonged applied pressure or touch may adjust the volume of the speaker. For example, if the touch or pressure is applied for one or more seconds the generated signal will be interpreted to adjust the volume. If the pressure exceeds a threshold level for one or more seconds, then the volume may be adjusted upward, whereas if the pressure is below the threshold the volume may be adjusted downward. In yet another embodiment, if the pressure or touch is applied over multiple time periods, such as for a period of three of more seconds, for example, and the pressure or touch is relatively consistent (i.e., no impulses) it may be determined that the pressure or touch is from being held and the pressure or touch may be discounted when interpreting signals from received from the pressure sensor 64. Other signals generated from other types of sensors may similarly be used to achieve similar functionality in speakers or other devices.

For example, other types of devices such as a camera and microphone may be similarly operated based on signals generated from sensors that are subsequently interpreted by a processor. The sensors may be located in areas of the housing adjacent to the camera and microphone. For example, in one embodiment, a pressure sensor or touch sensor may be located in the housing 12 near the camera to sense interaction with the housing near the camera. In response to touch or pressure being applied to the housing 12 near the camera, the touch sensor or pressure sensor generates an electrical signal that is directed to the processor which may interpret the signal and generate an output signal in response to the signal. As such, in response to touch or pressure being applied, the processor may output a signal to turn on or turn off the camera. Further, in another embodiment, an application operating on the computing device 10 may be used to interpret an input. For example, if a video chat program is currently operating, touch or pressure sensed near the microphone and/or camera may activate or turn off the camera and/or microphone.

In another embodiment, a portion of the housing 12 that forms a bezel 80 for the display 14 may have acoustic transducers 62, pressure sensors 64, touch sensors 65, and/or proximity sensors 66 located underneath its surface. The sensors may be used to receive a variety of user input. Returning to the speaker example, the sensors located in the bezel 80 may form a sensor region 82 that may be used to control the volume of the speakers 20 and/or provide user feedback. In one embodiment, a first side (such as the left hand side 82) of the bezel 80 may have sensors 81 configured to determine when pressure is applied to the bezel 80 or when the bezel 80 is touched. In one embodiment, for example, upward movement of the pressure or touch on the bezel 80 may increase the volume while movement downward may decrease the volume. Specifically, an initial touch or pressure on the bezel 80 may result in one or more sensors generating an electrical signal. As the pressure or touch moves upward along the bezel 80, sensors in the path of movement will generate increasingly stronger signals, while sensors from which the movement is away will generate weaker signals. The signals of all the sensors may be provided to the processor which may interpret the increasing and decreasing signals as indicating a user's intent to increase the volume and generate an output signal to adjust the volume upward.

Additionally or alternatively, the amount of pressure may act as a command to increase or decrease the volume. Further, in some embodiments, in response to pressure being applied, tapping on the bezel 80 (detected using acoustic transducers 62), or proximity of objects to the bezel 80 (sensed by the proximity sensors 66) icons or graphics may appear on the display 14 and/or on the bezel surface 80. The graphics may correlate to a particular function that may be controlled by the sensors located in the bezel 80. For example, as shown, the display 14 may show a graphical representation 83 of a speaker with bars indicating a volume level. The graphic may be translucent and overlay images that are concurrently shown on the display 14. Other operations may similarly be controlled by obtaining data from sensors located in the bezel 80 and the processor interpreting the data and providing an output signal to effectuate an output to the user. For example, in one embodiment, a lower portion 84 of the bezel 80 may include sensors (not shown) to provide sensor data that may be used to control the brightness of the display 14.

Figure 7:
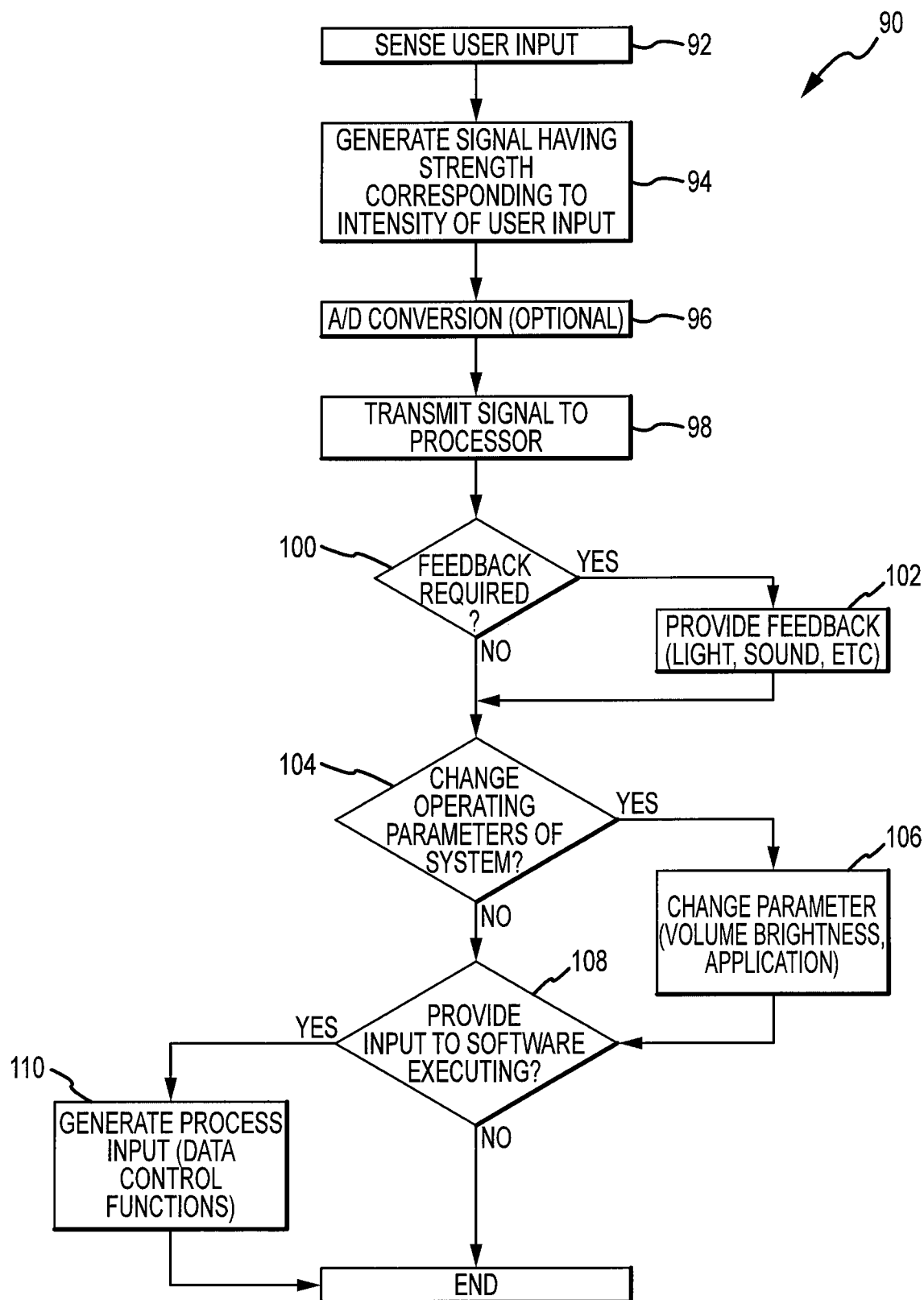
FIG. 7 is a flowchart illustrating a technique for operating the housing of the portable computing device of FIG. 5 as an I/O device.

FIG. 7 is a flowchart illustrating a technique 90 for operating the housing 12 as an I/O device. In particular, the technique 90 may begin by the housing 12 sensing user input, as indicated at block. 92. Upon sensing the user input, the housing 12 (or a sensor coupled to the housing 12) generates a signal corresponding to the user input, as indicated at block 94. As previously discussed, in some embodiments, the generated signal may be correlative to the intensity of the user input. That is, the stronger the user input, the stronger the generated signal will be.

The generated signal may be converted to a digital signal, as indicated at block 96, and transmitted to a processor, as indicated at block 98. The processor may then interpret the generated signal. Interpretation of the generated signals may include determining the type of user input, where the user input is coming from, i.e., what part of the housing, the strength of the generated signal, and how long the signal lasts, to determine what the generated signal means. After interpreting the data, the processor determines whether feedback should be generated based on the user input, as indicated at block 100, and may generate a signal to provide feedback, as indicated at block 102.

In addition to or instead of providing feedback, the processor may determine whether an operating parameter of the system should be changed in response to the user input, as indicated at block 104. If it is determined that the user input is intended to change an operating parameter, the parameter may be altered, as indicated at block 106. The alteration of an operating parameter of the system may include adjusting the volume of speakers or the brightness of the display, turning on or off devices (e.g., camera, microphone, speaker), initiating an application, etc.

After the operating parameters have been adjusted or if no change to operating parameters is warranted based on the user input, it may be determined if input should be provided to a software that is executing, as indicated at block 108. If it is determined that input should be provided to executing software, the processor may generate process input, as indicated at block 110. For example, in the event that a media player application is operating on the system, interactions such as pressure, touch, etc. on particular locations of the housing 12 may result in the processor generating input to the application such as input to control the operation of the application including, for example, providing input to skip, stop, play, reverse, pause, etc. the media that is being played by the media player application. In another embodiment, the input may be provided in the form of a keystroke, for example.

It should be understood that the technique 90 illustrated in FIG. 7 is merely provided as an example. In some embodiments, the order of executing the various steps may be different and may include more or fewer steps and/or different steps. Additionally, the technique 90 may be iterative and it should be understood as being applicable to one or more sensors and/or sensing technologies. For example, in a first iteration, generated signals from a proximity sensor may result in a first output (i.e. the lights being actuated) and subsequently generated signals from a pressure sensor may result in a second output such as adjusting the volume.

Figure 8A:
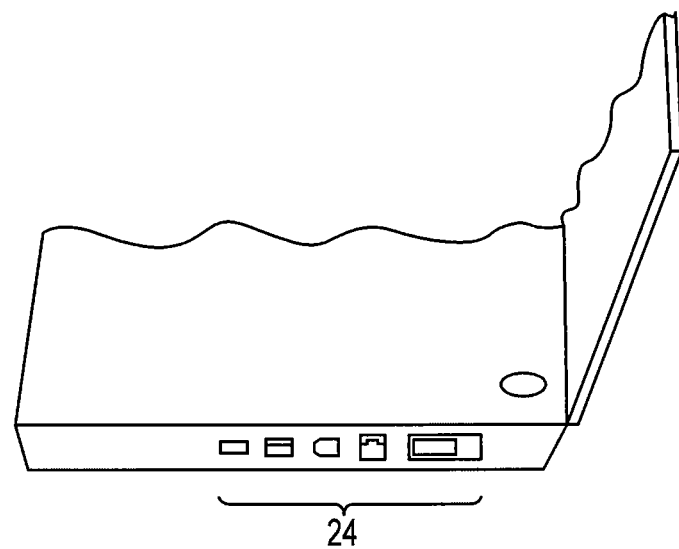
FIGS. 8A and 8B illustrate a partial side-view of the housing of the portable computing device of FIG. 4.
Figure 8B:
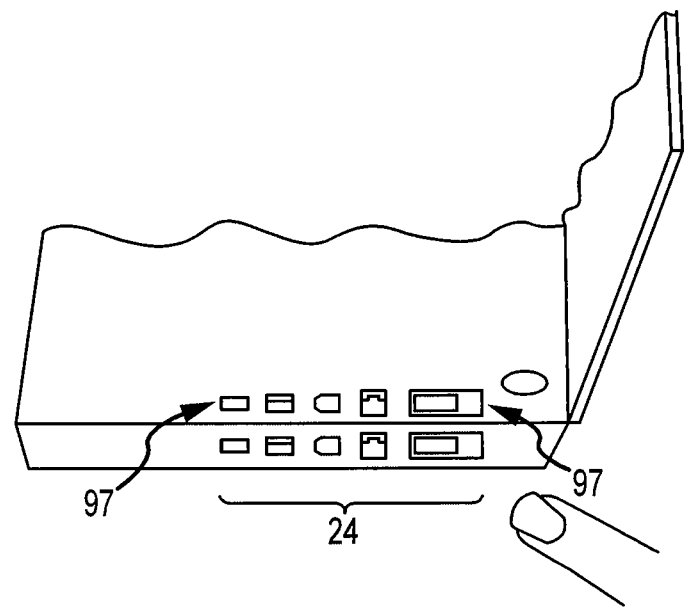

FIGS. 8A and 8B illustrate an example embodiment implementing the technique illustrated by the flowchart of FIG. 7. In FIGS. 8A and 8B, proximity sensors 66 may be located in the housing 12 near the ports 24 to detect when objects approach the ports 24. As shown in FIG. 8A, when no object is detected as being near the ports 24, there is no output/feedback provided to a user and the surface of the housing appears to be a non-functional wall, as there are no breaks in the housing surface for input or output devices.

In response to sensing the user input, i.e., an object approaching the ports 24, the proximity sensors 66 may generate a signal. In some embodiments, the generated signal from the proximity sensors 66 may be larger or smaller depending on how close to the ports the user (or an object) is. Generally, however, interpretation of the input sensed by proximity sensors 66 interpretation may be straightforward, as the device 10 may be configured to simply provide feedback when objects are within a particular distance, e.g. a few inches, from the ports 24. The strength of the signal generated by the sensor 66 may be used to determine the distance of an object from the ports 24. Specifically, if the signal provided to the processor exceeds a determined threshold signal strength above which it has been determined indicates an object being within a certain distance from the ports 24, the processor may determine to provide feedback. For example, upon sensing an object near the ports 24 and generating a signal that exceeds the threshold, the processor may generate an output signal to light sources (not shown) so that icons 97 may be illuminated or may otherwise appear on a top surface of the housing 12 to indicate the location and types of ports that are located on the side of the housing 12, as shown in FIG. 8B.

The surface of the housing 12 may be a microperforated surface that allows light to pass through the surface. In another embodiment, the housing 12 may be sufficiently thin where light output is to be provided so that light may shine though the housing surface. When not illuminated, the surface of the housing 12 may appear to be the same as other surfaces of the housing 12 that do not provide I/O functionality. The icons 97 may have the same orientation as the actual ports 24 to aid in coupling connectors to the ports 24.

In other embodiments, there may be multiple thresholds provided and time may be factored into the determination as to whether feedback will be provided or whether feedback should be ceased. For example, a first threshold may be used to determine when an object is within a few inches of the ports and a particular feedback may be provided, such as a speaker or light being actuated to provide feedback to a user. As the generated signal may increase as the object moves closer to the ports 24, one or more additional thresholds may be provided for altering the feedback provided. For example, if the second threshold is exceeded, the feedback may increase in intensity (e.g., the intensity of light output may increase). In yet another embodiment, a linear or continuous tracking of sensor signal can be applied. That is, the amount of actuation or variation of operation parameter can be proportional to the strength of the signal. Additionally, if it is determined that an object has been near the ports 24 for an extended period of time, e.g. more than a few seconds, the feedback, such as light output, may cease. It should be understood embodiments related to other functions may implement multiple thresholds to help fine adjust parameters, such as volume, brightness, etc.

Figure 9A:
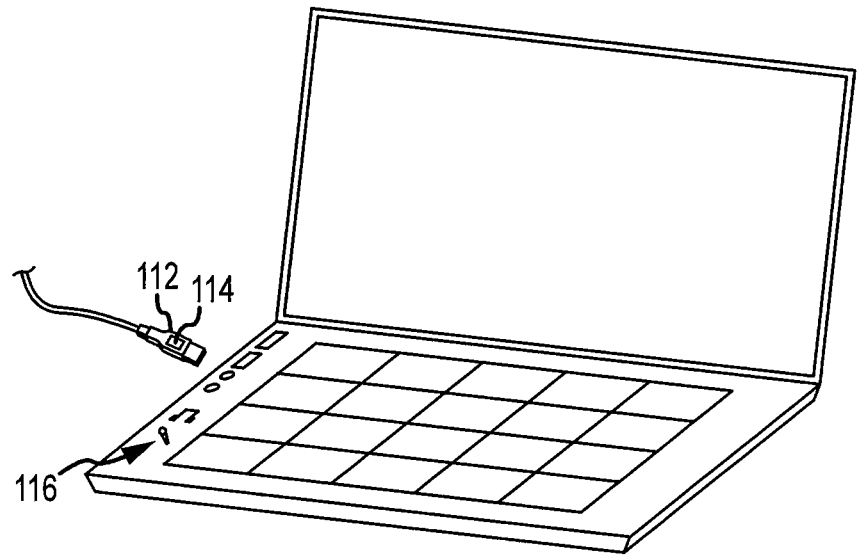
FIGS. 9A and 9B illustrates an embodiment configured to sense a radio frequency identification tag located on a connector.
Figure 9B:
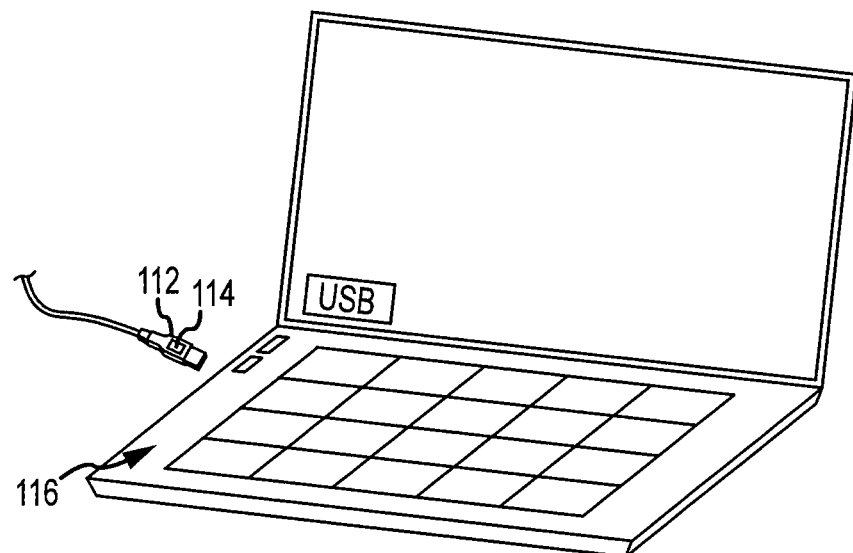

Turning to FIGS. 9A and 9B, an alternative embodiment is illustrated wherein a connector 112 may be configured to identify itself to the system 10 as it approaches a port or a bank of ports. Specifically, in one embodiment, the connector 112 may be equipped with a radio frequency identification ("RFID") tag 114. The RFID tag 114 may be active or passive. In one embodiment, the device 10 may poll for RF input, such as input received from the RFID tag 114 on the connector 112. In another embodiment, the device 10 may seek for RF signals only after sensing an object in proximity to the ports as determined using proximity sensors including RF, IR, inductive, and/or capacitive sensing technologies. The RFID tag 114 may provide identifying information, such as: the type of connector; type of device that is coupled to the connector 112; device ID; etc. In other embodiments, the RFID tag 114 may simply provide a serial number or other identifier that may allow for identification by the device 10 using a lookup table or other technique. One or more icons or lights 116 may be illuminated to indicate a corresponding and/or available port. In one embodiment, only the icon representing a corresponding port is illuminated, as indicated in FIG. 9B. Additionally or alternatively, the port may be identified on the display of the device, e.g., "USB." Additionally or alternatively, the device may provide an audible output indicating the port type. For example, the device may verbally state "USB" or may simply provide a beep or other audible signal to indicate a particular port. In another embodiment, the icon of the corresponding port is illuminated with a color such as green and other icons may be illuminated another color, such as red, to indicate they do not correspond to the connector. In yet another embodiment, the corresponding port graphic may be illuminated more brightly than non-corresponding ports.

It should be understood that a variety of different icons 116 or images or light patterns may be provided. As described above, the icons may appear like the ports themselves. While this maybe valuable in helping the user to orient the connector, in some cases, the ports may tend to look confusingly similar. As such, it may be useful to so iconic representations for the ports using a port logo (typically appears on the enclosure). This may be particularly useful for ports like the headphone/microphone ports, which otherwise look identical. Alternatively, the name of the port may be provided on the surface in conjunction with the port symbol or instead of the symbols.

In yet another embodiment, the icons 116 may be controlled by a "set up assistant" software or other software related setting up the computer or connecting a device. The set up assistant software may be used to guide a user when setting up a computer for the first time. For example, when the computer is first started up (i.e., turned on for the first time by a user), the set up assistant may ask for a mouse and/or keyboard to be connected and may illuminate the appropriate port icons, such as the USB icons, for example.

Turning to FIG. 1A, another portable computing device 120 is illustrated in accordance with an alternate embodiment. As illustrated, the portable computing device 120 includes a substantially smooth surface 122 rather than the conventional keyboard 16 illustrated in the portable computing device 10 of FIG. 4. The surface 122 is part of the housing 124 of the computing device 120 and does not include a separate device built through the housing. As such, the surface is continuous extending without breaks, lines, gaps, etc. The housing 124 includes sensors and actuators 126 shown as dashed lines in FIG. 10B that enable the surface 122 to act as an input device for the computing device 120. Stated more specifically, sensors and actuators 126 are provided underneath the surface 122 and may provide a virtual keyboard (i.e., an input device that imitates the functionality of an actual keyboard but does not appear to be a keyboard unless activated).

The sensors and actuators 126 may be arranged in a variety of configurations. As illustrated, the sensors and actuators 126 may be arranged into sensor/actuator packages 128 that each may include one or more sensor and one or more actuator. Additionally, the sensors and actuators 126 may be generally arranged in an array pattern or in a pattern that mimics an actual keyboard. In one embodiment (not shown) sensors may be arrayed such that the entire area of the surface 122 may operate as an input device. In other embodiments, sensors may only be provided under defined areas of the surface 122. For example, the sensors may be provided under an area that approximates the size and dimensions of a keyboard and/or trackpad and there may be a one-to-one correlation between the number of sensors provided and the number of keys in a conventional keyboard. In yet another embodiment, there may be fewer sensors than light sources located under the surface 122. For example, there may be provided an array of light sources and sensors may only be provided in between two or more of the light sources. For example, sensors may be provided between two light sources or in the center of three light sources arranges in a triangle in the array or in the center of four light sources arranged in a parallelogram in the array. Determination as to where the surface 122 was struck (and what keystroke to register) may be achieved through comparative tracking or other suitable techniques. In one embodiment, the position touched by a user may be determined based on relative amplitude of electrical signals generated by sensors and/or triangulation or other localization technique of those sensors that generated the strongest signal.

Figure 10A:
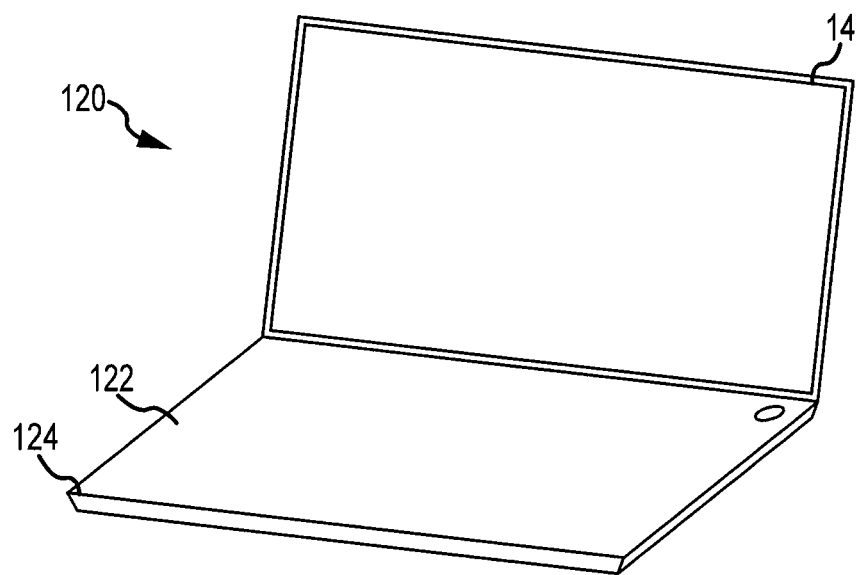
FIGS. 10A and 10B illustrates a portable computing device having a virtual keyboard in accordance with an embodiment.
Figure 10B:
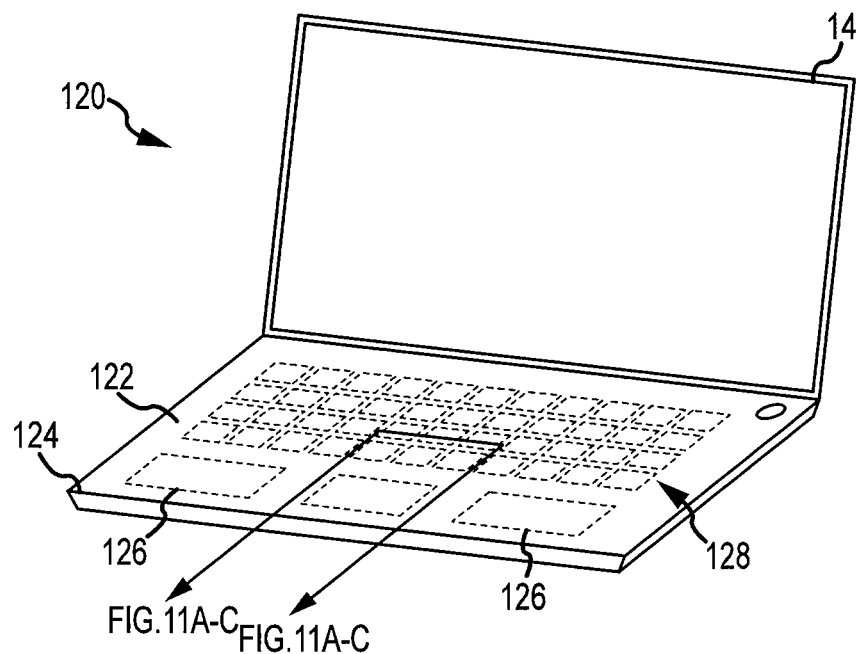
Figure 11A:
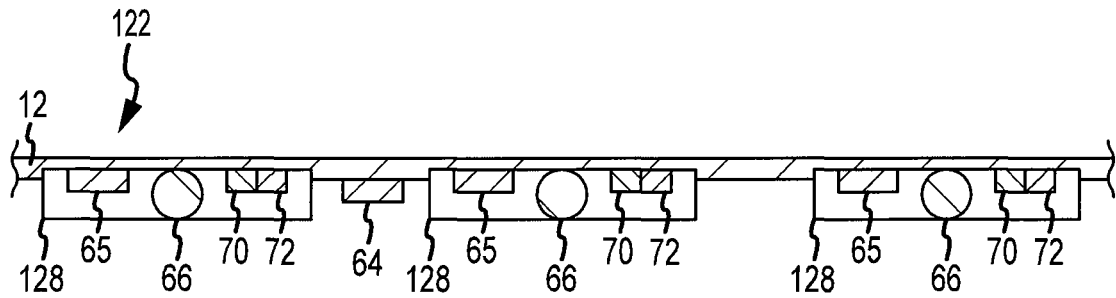
FIGS. 11A-11C are cross-sectional views of sensor/actuator packages that may generally be related to the portable computing device of FIG. 10A.
Figure 11B:
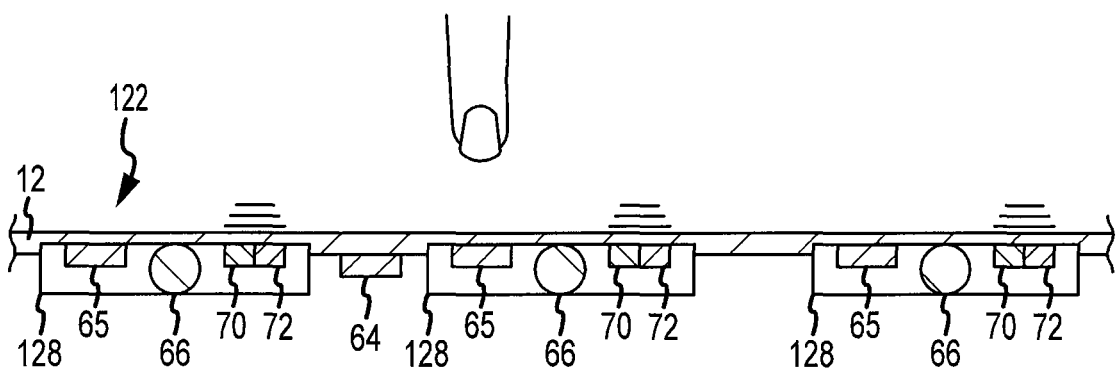
Figure 11C:
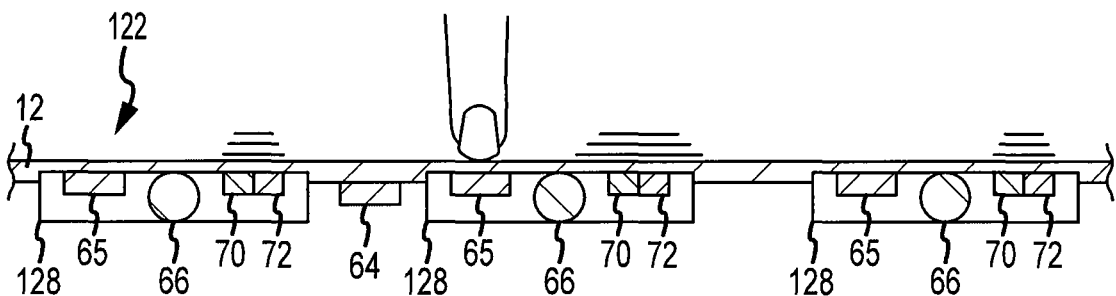

A simplified cross-sectional view of the surface 122 and example sensor/actuator packages 128 that may generally correspond to the keyboard illustrated in FIGS. 10A and 10B is shown in FIGS. 11A-11C. As shown in FIG. 11A, the sensor/actuator packages 128 may include a touch sensor 65 and/or a pressure sensor 66, light sources 70, and/or a haptic feedback device 72. A proximity sensor 64 (which may be implemented as an acoustic, light, inductive, capacitive, magnetic, or IR based sensor, for example) may be used to determine when objects are in close proximity. Although sensor/actuator packages 128 may include proximity sensor 64 in the illustrated embodiment, only a single proximity sensor 64 is provided for the entire surface. Alternatively, several proximity sensors 64 may be strategically positioned under the surface to reasonably determine when an object is near or over the surface. As such, the proximity sensor 64 may be positioned regionally in between the sensor/actuator packages 128 or in only one or a few sensor/actuator packages 128.

In one embodiment, as illustrated in FIG. 11B, upon sensing an object in close proximity to the surface 122, the light sources 70 and haptic feedback device 72 may activate. In one embodiment, the light sources 70 may illuminate to indicate a keyboard configuration. For example, in one embodiment, the light sources may illuminate to show a QWERTY keyboard configuration. Additionally, in some embodiments, the haptic device 72 may begin to vibrate at a low amplitude. The vibration creates a "live" surface, thereby providing a different tactile effect to users touching the vibrating surface 122 as compared to a surface that is not vibrating. In one embodiment, the live surface may include an area that approximates the size and location of a conventional keyboard, for example. In other embodiments, the live surface may include on a small area of a larger surface or may cover an entire contiguous surface through which user input may be provided. Additionally, while embodiments of the haptic feedback device 72 have been described as operating in a "vibration" mode, in other embodiments, the haptic feedback device 72 may provide other types of feedback. For example, the haptic feedback device 72 may provide mechanical, electromechanical, electromagnetic, piezo, acoustic, thermal, pneumatic, microfluidic, etc. modes that may provide various other types of haptic feedback.

As more than one pressure sensor 66 or touch sensor (not shown) may detect a touch of the surface 122, the location of the touch may be determined based on the relative size or amplitude of the signal generated by the sensed pressure between the different sensors. That is, the pressure sensor 66 located the closest to where pressure is applied will register the largest sensed pressure. In another embodiment, the location of the touch may be determined by using at least sensors that register the touch to triangulate the most likely position of the touch on the housing surface. Additionally, signals registered by more than one sensor type may be used in combination to determine the location that surface 122 is touched. For example, proximity sensors, touch sensors, pressure sensors, and/or acoustic transducers may generate signals that may be used together to determine the most likely location the surface 122 was touched.

Upon determining the position of the surface 122 that is touched, the haptic device 72 located nearest the location may be pulsed to provide a higher amplitude vibration than the other haptic actuators, as shown in FIG. 11C. The higher amplitude vibration provides feedback to a let a user know that the applied pressure has registered a keystroke. In another embodiment, the haptic device 72 may operate in conjunction with a speaker (not shown) so that audible feedback is also provided to a user. In one embodiment, only the haptic device 72 may be active. Furthermore, in order to provide timely haptic feedback, proximity sensors may generate signals in anticipation of contact with the surface 122 that may help to determine where the surface 122 is to be touched.

It should be understood that in other embodiments, different sensors and actuators, as well as different combinations of sensors and actuators may be implemented to achieve a desired effect. For example, in one embodiment, the actuator/sensor package may include an organic LED configured to emanate light through the microperforated surface 122 when the proximity sensor senses objects in close proximity or if pressure on the surface 122 is sensed by the pressure sensor, for example. As such, the keyboard may be "hidden" until one or more of the sensors determine that a user is interacting with the surface 122.

Additionally or alternatively, in one embodiment the surface 122 may operate as a configurable or customizable input surface. Specifically, the output provided on the surface (i.e., lighted symbols, graphics, icons, etc.) may be modified according to a particular environment in which the portable computing device 120 is operating or applications operating thereon. As the output of the surface 122 changes or is changed, input sensed on the surface 122 is correspondingly interpreted differently. Specifically, in one embodiment, if the computing device 120 is operating a media application to provide media content to a user, such as media from a DVD or other source, a row of sensor/actuator packages may change from their default functions, such as operating as function keys (e.g., F1 key, F2 key, F3 key, etc.), to function as controls for operating the media application. A play button, a rewind button, a fast-forward button, a pause button, a stop button, a menu button, etc. may be provided rather than function keys on the surface 122 and the actuation of the buttons will effectuate the operation of a play button, a rewind button, and so forth, rather than the operation of a function key.

In yet another alternative embodiment, a user may configure the surface 122 to a custom configuration. The system 120 may be configured to operate in an operating mode and a configuration mode. The system 120 may be placed in a configuration mode by initiation of configuration software, actuation of a hardware or software switch, or any other suitable manner. Once in the configuration mode, a user may define portions of the surface 122 to provide specified input to the system 120. For example, the configuration mode may provide an application in which a user can manipulate how touching or applying pressure to certain areas of the surface 122 are interpreted.

In one embodiment, while in the configuration mode, a user's finger may touch the surface 122 to select a particular portion of the surface that has been defined to provide a particular input (for example, the user may touch a region of the surface 122 that has been defined to function as a number pad). The user may then drag the finger across the surface 122 to a desired location on the surface 122 and remove the finger. The surface 122 then reconfigures such that the region in which the finger was removed from the surface 122 has been redefined to provide input signals of the location that the finger originally touched, i.e., the number pad. In another example, the user may move the controls for volume to a desired location on the surface 122. In another embodiment, the application may simulate the surface 122 on the display 14. The simulated surface may provide a map of the current surface configuration and the user may manipulate the simulated surface to re-configure how input from the surface 122 is interpreted by the system 120.

Once the user has reconfigured the surface 122, the configuration may be saved in memory of the system 120 and the surface 122 may operate in accordance with the reconfiguration. In the reconfigured state, light sources that provide output indicative of the input provided by a particular the surface 122 to the system 120 may reflect the reconfigured state. For example, if the number pad has been dragged from the right side of the surface 122 to the left side of the surface 122 in the reconfiguration, the light sources on the left side will cause a number pad to appear on the left side of the surface 122. In one example, an OLED based light source underneath the surface would show a reconfigured image in a new location. In another example, an image on a main computer display may show a surface map with indication of where the new number pad is located on the surface 122.

Figure 12A:
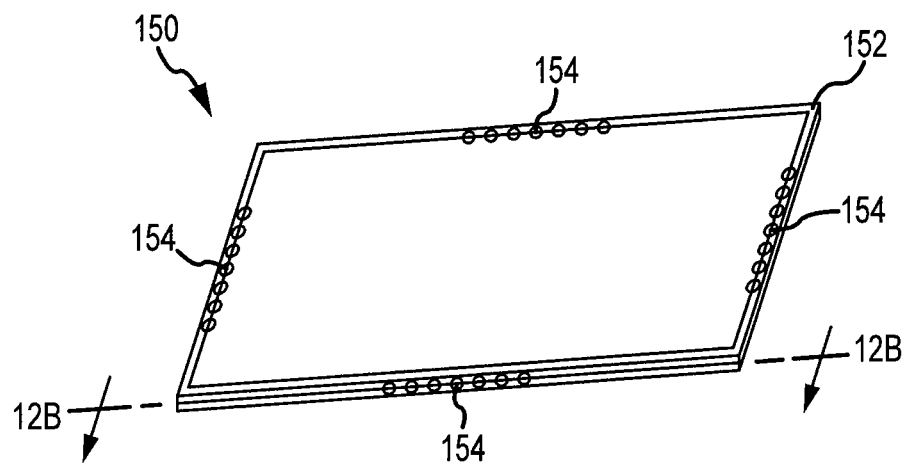
FIG. 12A-12B illustrates a tablet computing device and a cross-sectional view of the device in accordance with an embodiment.
Figure 12B:
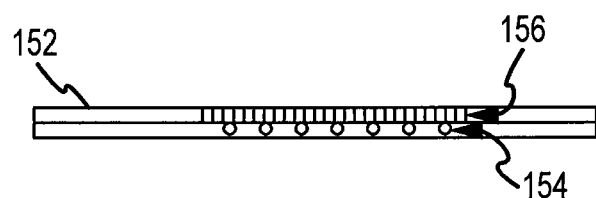

FIG. 12A illustrates a tablet computing device 150 in accordance with yet another embodiment. As with the above described embodiments, a housing 152 of the tablet computing device contains a number of sensors/actuators 154 similar to embodiments described above. In particular, for example, in one embodiment the housing 152 may include touch sensors, pressure sensors, light emitters, and/or haptic actuators, etc. represented by the sensors/actuators 154 and accelerometers. Similar to embodiments described above, the housing 152 of the tablet computing device 150 may be configured to provide input and output for the computing device 150. FIG. 12B illustrates a cross-sectional view of the device 150 showing apertures 156 through an external wall of the housing 152. The apertures are microperforations in housing 152 to allow for output such as light to pass through the housing 152. The microperforations may be formed in accordance with known techniques. The microperforations 156 are generally imperceptible to a naked eye. Thus, the surface of the housing 152 does not appear to be an input/out device.

In one example, the volume outputted by the device's speakers of the device and/or the brightness of the display may be adjusted by touching or applying pressure to the housing 152. In one embodiment, the amount of pressure may be determinative as to how the volume will be adjusted. For example, a pressure threshold may be provided above which the volume will be adjusted up and below which the volume may be adjusted down. In other embodiments, the volume may be adjusted by determining a movement upward or downward on the surface and adjusting the volume accordingly, i.e., adjusting up for a sensed upward movement.

Additionally, the sensors of the sensor/actuator 154 may be useful for determining when the tablet computing device 150 is being held and where the device 150 is being held. For example, if a user is holding the device on a left side of the device 150, the device 150 may sense the touch and/or pressure resultant from the holding but not be able to interpret the sensed touch and/or pressure. However, if the touch and/or pressure is applied consistently, i.e., the touch and/or pressure does not include intermittent or periodic impulses, and is applied for a prolonged period of time, e.g., more than a second or a few seconds, then the device 150 may determine that the touch and/or pressure applied to the left side of the device is from the device 150 being held. Hence, the touch and/or pressure sensed from the left side will be discounted as being related to the user holding the device 150 and not interpreted as input from the user to perform a function.

The input from the sensors may be interpreted differently depending on the context in which user input is received. In one embodiment, sensed input may be used to unlock or awake the device 150 from a sleep mode. For example, if the device 150 is locked or asleep, upon determining a user handling the device 150 through sensing touch or pressure being applied to particular parts of the housing 152 and or movement of the device 150, an application or start-up routine may be launched that requires certain input to unlock or otherwise bring the device 150 to a fully functional state. The housing 152 may be used to receive the input necessary to unlock the device. In one example, a user may apply pressure to the left side and the right side of the device in some combination (e.g., left, left, right, right, etc.) to unlock the device.

Additionally, the input from sensors located at a particular area of the housing 152 may be interpreted differently from input from sensors located at other areas of the housing 152. For example, input (such as pressure or touch) sensed by sensors located near a lower edge of the housing may be interpreted to adjust the brightness of the display, whereas input sensed by sensors located near the right hand side of the housing 152 may be interpreted to adjust the volume output by speakers of the device 150. In other embodiments, different types of input received from a particular area of the housing 152 may be interpreted in different ways. For example, sliding a finger along the lower edge of the housing 152 may adjust the brightness of the display, whereas a double tap to the lower edge of the housing may turn the device on and/or off.

The sensors of the sensor/actuator 154 may also be used in combination with the accelerometers to appropriately orient the output of the tablet computing device 150. Returning to the example of the user holding the tablet computing device 150 on the left side, if the accelerometers sense a rotational movement about an axis determined to be near where the touch or pressure from holding the device 150 is applied, content displayed by the tablet may be rotated commensurately to facilitate a user viewing the content.

Although various specific embodiments have been described above, it should be appreciated that a single device may implement various different aspects of the specific embodiments described above. Further, one or more aspect may be implemented in an embodiment without including other aspects.

What is claimed is:

1. Apparatus comprising:
   a housing having a surface with microperforations;
   a proximity sensor configured to sense an object in close proximity to the surface;
   at least one light source configured to emit light through the microperforations in response to the proximity sensor sensing the object in close proximity to the surface; and
   a pressure sensor configured to detect a touch input on the surface.

2. The apparatus defined in claim 1, further comprising:
   a haptic feedback device configured to activate in response to the proximity sensor sensing the object in close proximity to the surface.

3. The apparatus defined in claim 2, wherein the haptic feedback device is configured to vibrate at a first amplitude in response to the proximity sensor sensing the object in close proximity to the surface.

4. The apparatus defined in claim 3, wherein the haptic feedback device is configured to vibrate at a second amplitude that is greater than the first amplitude in response to the pressure sensor detecting the touch input on the surface.

5. The apparatus defined in claim 1, further comprising:
   a controller enclosed in the housing, wherein the controller is configured to:
      place the at least one light source in a first state to display a first symbol; and
      place the at least one light source in a second state to display a second symbol that is different than the first symbol.

6. The apparatus defined in claim 5, wherein the controller is further configured to:
   while the at least one light source is in the first state, interpret the touch input on the surface as a first instruction; and
   while the at least one light source is in the second state, interpret the touch input on the surface as a second instruction that is different than the first instruction.

7. The apparatus defined in claim 5, wherein the first symbol is a function key label and wherein the second symbol is a playback control symbol.

8. The apparatus defined in claim 1, wherein the at least one light source is operable in a first state in which the light is emitted through the microperforations and a second state in which light is not emitted through the microperforations and the microperforations are imperceptible to the naked eye.

9. Apparatus comprising:
   a housing having a surface with an input area, wherein the input area includes microperforations;
   at least one light source operable in a first state in which light is not emitted and the input area is hidden and a second state in which light is emitted through the microperforations and the input area is visible; and
   a sensor configured to detect touch input to the input area.

10. The apparatus defined in claim 9, wherein the sensor is a touch sensor.

11. The apparatus defined in claim 9, wherein the sensor is a pressure sensor.

12. The apparatus defined in claim 9, wherein the sensor is a capacitive sensor.

13. The apparatus defined in claim 9, further comprising:
    a haptic actuator that is configured to provide haptic feedback at the input area in response to the touch input.

14. The apparatus defined in claim 9, wherein the surface with the input area comprises plastic.

15. The apparatus defined in claim 9, wherein the surface with the input area comprises glass.

16. Apparatus comprising:
    a housing having a surface with microperforations;
    a proximity sensor configured to sense an object in close proximity to the surface;
    at least one light source configured to emit light through the microperforations in response to the proximity sensor sensing the object in close proximity to the surface; and
    a haptic feedback device configured to activate in response to the proximity sensor sensing the object in close proximity to the surface.

17. The apparatus defined in claim 16, wherein the haptic feedback device is configured to vibrate at a first amplitude in response to the proximity sensor sensing the object in close proximity to the surface.

18. The apparatus defined in claim 17, wherein the haptic feedback device is configured to vibrate at a second amplitude that is greater than the first amplitude in response to touch input on the surface.

19. The apparatus defined in claim 16, wherein the haptic feedback device is configured to provide haptic feedback in response to touch input on the surface.

20. The apparatus defined in claim 16, further comprising:
    a touch sensor configured to detect a touch input on the surface.

* * * * *